(12) United States Patent
Wittenstein

(10) Patent No.: US 9,961,093 B1
(45) Date of Patent: May 1, 2018

(54) MONITORING FOR REVERSE-CONNECTION NETWORK ACTIVITY TO DETECT A REMOTE-ADMINISTRATION TOOL

(71) Applicant: EMC Corporation, Hopkinton, MA (US)

(72) Inventor: Andreas Wittenstein, Granada (ES)

(73) Assignee: EMC IP Holding Company LLC, Hopkinton, MA (US)

( * ) Notice: Subject to any disclaimer, the term of this patent is extended or adjusted under 35 U.S.C. 154(b) by 267 days.

(21) Appl. No.: 14/870,492

(22) Filed: Sep. 30, 2015

(51) Int. Cl.
*G06F 17/00* (2006.01)
*H04L 29/06* (2006.01)

(52) U.S. Cl.
CPC ................. *H04L 63/1416* (2013.01)

(58) Field of Classification Search
CPC ........ G06F 21/56; G06F 21/57; G06F 21/577; G06F 11/3006; G06F 11/32; G06F 17/30; G06F 7/00; G06Q 20/401; H04L 2463/144; H04L 41/0893; H04L 41/14; H04L 43/045; H04L 43/0876; H04L 63/0263; H04L 63/1416; H04L 63/20; H04L 43/026; H04L 43/04; H04L 63/0245; H04L 63/029; H04L 63/1425; H04L 63/1491
See application file for complete search history.

(56) References Cited

U.S. PATENT DOCUMENTS

| 2004/0187023 A1* | 9/2004 | Alagna | G06F 21/56 726/24 |
| 2014/0115705 A1* | 4/2014 | Fujishima | H04L 43/028 726/23 |

OTHER PUBLICATIONS

R. Fielding, et al.; "Hypertext Transfer Protocol (HTTP/1.1): Message Syntax and Routing"; downloaded from https://tools.ietf.org/rfc/rfc7230 on Oct. 5, 2015; Internet Engineering Task Force (IETF); Jun. 2014; pp. 1-84.
R. Fielding, et al.; "Hypertext Transfer Protocol (HTTP/1.1): Semantics and Content"; downloaded from https://tools.ietf.org/rfc/rfc7231 on Oct. 5, 2015; Internet Engineering Task Force (IETF); Jun. 2014; pp. 1-95.
T. Berners-Lee, et al.; "Uniform Resource Identifier (URI): Generic Syntax"; downloaded from https://tools.ietf.org/rfc/rfc3986 on Oct. 5, 2015; Network Working Group; Jan. 2005; pp. 1-57.

\* cited by examiner

*Primary Examiner* — Abiy Getachew
(74) *Attorney, Agent, or Firm* — BainwoodHuang

(57) ABSTRACT

Techniques are disclosed for detecting malicious remote-administration tool (RAT) software by detecting reverse-connection communication activity. Communications are monitored over one or more persistent connections, such as TCP (Transmission Control Protocol) connections. Each monitored connection is between an initiator device and a follower device, and the initiator device is identified as the device that sent an initial packet to the follower device in order to open the connection. The disclosed techniques detect reverse-connection activity on the connection by detecting that communications over the connection are actually driven by the follower device, indicating that a malicious RAT is using the connection.

22 Claims, 12 Drawing Sheets

MONITORING FOR REVERSE-CONNECTION NETWORK ACTIVITY TO DETECT A REMOTE-ADMINISTRATION TOOL

BACKGROUND

As it is generally known in the area of computer security, an advanced persistent threat (APT) is a set of stealthy and continuous computer hacking processes, often orchestrated by human(s), which are used to attack a specific entity. Many advanced persistent threats (APTs) against computer networks involve the use of remote-administration tools (RATs), which permit attackers to remotely administer target systems through a backdoor as if they had real-time local access to them, throughout the post-infection period. RAT server software is installed on a computer within the target network, typically as Trojan software delivered via phishing email, drive-by download, or portable storage device, often by an unwitting victim. Once installed, the RAT server typically connects to an external command and control client, ordinarily operated by a human attacker, who wields the RAT server to reconnoiter and further infiltrate the network, locating target resources, observing and impersonating key personnel, and potentially exfiltrating valuable resources or performing other malicious activities.

Detecting and thwarting RATs would effectively cripple many APTs, because without remote-administration capability, APTs need to rely on moles or other insiders within the target entity.

SUMMARY

Previous approaches to detecting RATs have exhibited significant shortcomings. For example, some previous approaches to detecting the presence of a RAT server have operated by checking for the presence of improper files in system or application directories, checking for improper sizes or checksums of trusted files, and/or checking for improper processes running on a computer. However, RAT developers have learned to evade such checks, for example by having the RAT server embed itself in system software or in trusted application software such as a browser, either by modifying the stored executable code, or by patching the in-memory running process. Other evasion techniques have included using rootkits to hide or camouflage foreign or modified files, disabling or modifying standard detection software on the infected machine, and even removing competing RAT software.

Previous approaches to detecting the activities of RAT servers have included checking for communications with known or suspected RAT client addresses, checking for RAT-associated activity such as exfiltration of recognizable privileged information, and/or looking for signals such as periodic beaconing, or other RAT activity on certain channels at unusual times. However, RAT developers have also learned to evade these types of checks by techniques such as rapidly modifying and varying RAT behavior, hiding RAT communications in covert channels, or blending RAT communications into high-traffic overt channels. Other evasion techniques have included hijacking trusted domains and employing domain-generation algorithms, compressing high-volume information, and encrypting the information, often steganographically. As a result, previous techniques for detecting the activities of RAT servers have had unacceptably high false-positive and false-negative rates.

To address these and other shortcomings of previous solutions, new techniques are disclosed for detecting the activities of malicious RAT software by detecting reverse-connection communication activity. In the disclosed techniques, communications are monitored with regard to one or more persistent connections, such as TCP (Transmission Control Protocol) connections. Each monitored connection is between an initiator device and a follower device, with the initiator device being identified as the device that sent the first packet between the initiator device and the follower device in order to open the connection. The disclosed techniques detect reverse-connection activity on the connection, by detecting that communications over the connection are actually driven by the follower device, indicating that a RAT is using the connection. Detected reverse-connection activities are indicative of a RAT using a connection, since communications over a normal connection are "forward", in that they are driven by a client in a device that sends an initial packet to open a connection with a server in a follower device. In contrast, reverse-connection activity, in which the follower device drives subsequent communications on the connection, indicates that a RAT server has initiated a connection with a RAT client, as is typically required for RAT operation. For example, when a RAT server is deployed inside a private local-area network, e.g. within a computer network that is shielded by a network-address translator and other firewall components, the RAT server cannot be addressed directly over the Internet by an external RAT client. RAT clients, on the other hand, may be positioned as Internet resources that are directly addressable by the RAT server. As a result, a RAT client operator cannot initiate a connection with the RAT server, but must instead wait for the RAT server to autonomously initiate a persistent connection with the RAT client. Using the disclosed techniques, the device hosting the RAT server is identified as the initiator device, since it is the source of the initial packet transmitted to open the connection with the RAT client. The device hosting the RAT client is the recipient of the initial packet transmitted to open the connection, and is therefore identified by the disclosed techniques as the follower device. Once the RAT server has initiated the connection with the RAT client, subsequent communications between the two devices are driven by the device hosting the RAT client, i.e. the follower device, and such communications are identified by the disclosed techniques as reverse-connection activity.

In response to detecting reverse-connection activity on the connection, an output may be generated indicating that a malicious remote-administration-tool is using the connection. The output may be passed to a graphical user interface for display to a user, e.g. a network administrator, and/or may cause a corrective action to be automatically taken. An output may be generated, for example, by passing one or more connection sense outputs from one or more connection sense analyzers to a rules engine or the like, where each connection sense output indicates whether or not the corresponding connection sense analyzer has detected that communications over the connection are driven by the follower device. The rules engine may then apply one or more system administration or security rules to determine an appropriate output or action in response to specific sets of received connection sense outputs.

Embodiments based on the disclosed techniques provide significant advantages over previous technologies. For example, using the disclosed techniques, RATs cannot avoid detection by simply embedding the RAT server in system software or trusted application software such as a browser, since the embedded RAT server must still perform reverse-connection activities in order to connect to a RAT client. Other evasion techniques that hide or camouflage RAT files and/or disable or modify standard detection software are similarly ineffective in avoiding detection by the disclosed techniques for detecting RAT activities. In addition, the disclosed techniques do not require a priori knowledge of specific RAT client addresses and/or individual communication patterns of specific RAT servers. Moreover, since reverse-connection activity is needed for the basic operation of many if not all RAT servers when connecting to RAT clients, embodiments of the disclosed techniques may be used to significantly reduce or even completely eliminate the unacceptably high rates of false-positive and false-negative indications associated with using previous approaches to RAT activity detection.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided only by way of example to illustrate various features and principles of the invention, and that the invention itself is broader than the specific examples of embodiments disclosed herein.

Figure 1:
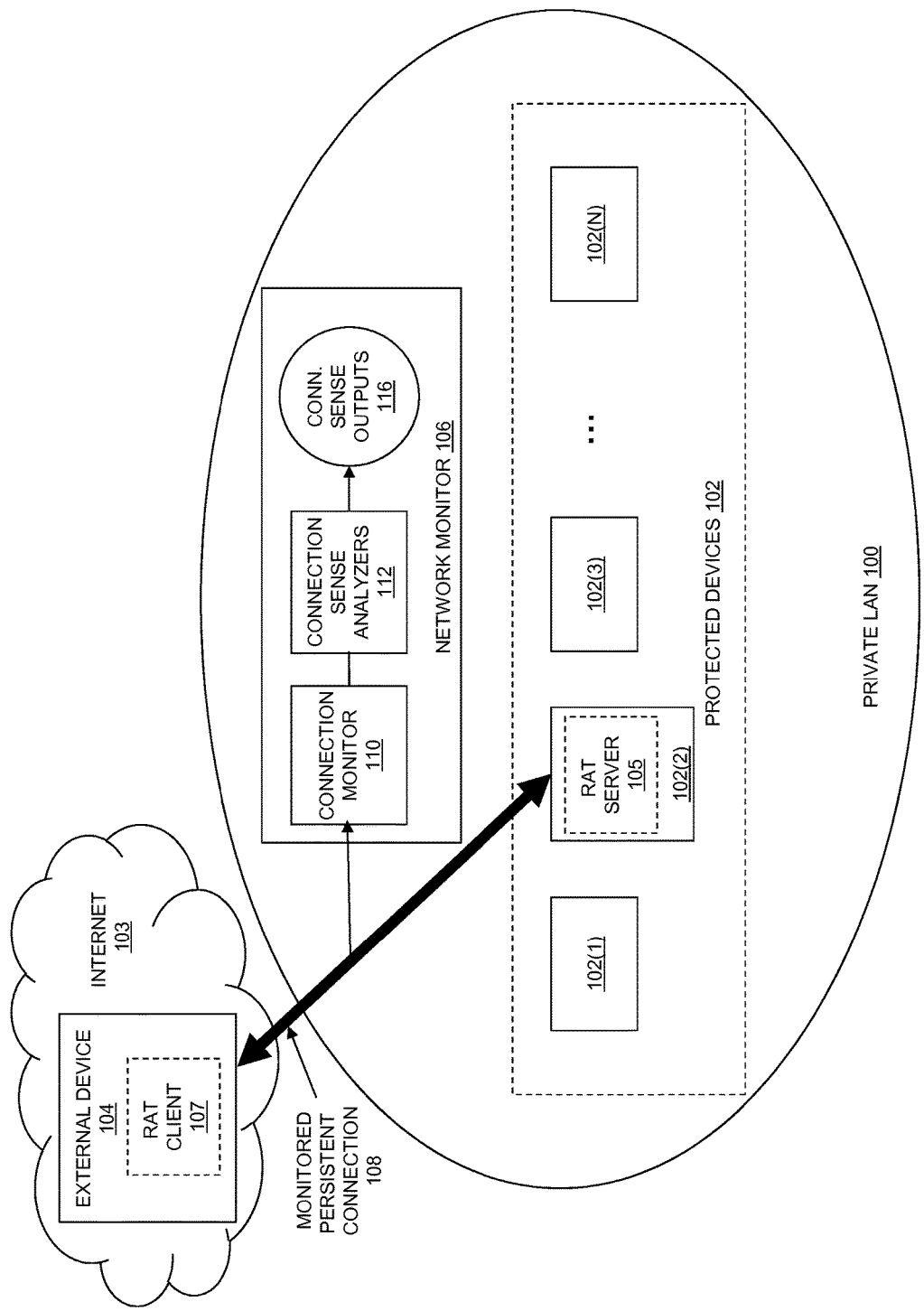
FIG. 1 is a block diagram showing components in an illustrative embodiment of the disclosed techniques detecting inbound reverse-connection activity on a monitored connection in an example of an operational environment in which embodiments of the disclosed techniques may be practiced.

FIG. 1 is a block diagram showing components in an illustrative embodiment of the disclosed techniques for detecting reverse-connection activity with regard to a monitored connection, in an example of an operational environment in which embodiments of the disclosed techniques may be practiced. As shown in FIG. 1, a Private LAN (Local Area Network) 100 includes Protected Devices 102, shown as devices 102(1) through 102(N). Private LAN 100 may belong to and/or be under the control of an entity such as a business, governmental agency, and/or private individual, and access to and/or use of Protected Devices 102 is restricted to individuals, devices and/or programs that are granted access and appropriate authorizations by that entity. While the Protected Devices 102 are communicably interconnected within Private LAN 100, access to Protected Devices 102 from outside of Private LAN 100 is prohibited except with regard to such authorized individuals, devices and/or programs.

In the example of FIG. 1, Private LAN 100 is also communicably connected to an external, unsecured network, shown for purposes of illustration as the Internet 103. For example, in one embodiment, each of the Protected Devices 102 is assigned an IP (Internet Protocol) address from a private IP address space of Private Network 100, following the standards set by RFC 1918 for Internet Protocol Version 4 (IPv4), and RFC 4193 for Internet Protocol Version 6 (IPv6). Accordingly, in such an embodiment, Protected Devices 102 are provided access to the Internet 103 at least in part via a network address translator (NAT) gateway or the like. An additional firewall may also be located between Private LAN 100 and the Internet 103, to further prevent unauthorized access to Protected Devices 102.

Protected Devices 102 may each be made up of or include any specific type of computer or computerized electronic device, including but not limited to server computers, desktop computers, laptop computers, tablet computers, smartphones and/or digital personal assistants, network appliances, wearable devices, vehicles or vehicle subsystems, and/or any other specific type of electronic device having at least one microprocessor and operable to store and execute program instructions.

In the example of FIG. 1, a RAT Server 105 has been deployed in one of Protected Devices 102, i.e. within Protected Device 102(2). During its operation, the RAT Server 105 establishes a persistent connection with a RAT Client 107 that is located outside of Private LAN 100, and shown in FIG. 1 executing on an External Device 104 located on the Internet 103. External Device 104 may consist of or include any specific type of computer that is capable of executing the RAT Client 107. RAT Client 107 may, for example, be under the command and control of a human operator, e.g. a user of External Device 104.

The network communication activities between RAT Server 105 and RAT Client 107, e.g. transmission and reception of one or more TCP packets and/or HTTP messages, are shown in FIG. 1 by Monitored Persistent Connection 108. A Network Monitor 106 monitors Monitored Persistent Connection 108, for example using a Connection Monitor 110. Connection Monitor 110 may, for example, be embodied using a hardware and/or software based packet analyzer (also known as a network analyzer, protocol analyzer, or packet sniffer) that captures each packet communicated over Private LAN 100, and that decodes the raw packet data as needed in order to expose the contents of each packet conveyed between Protected Device 102(2) and External Device 104 to one or more connection sense analyzers, shown as Connection Sense Analyzers 112. Similarly, messages conveyed within such packets communicated over Private LAN 100, such as HTTP messages conveyed between Protected Device 102(2) and External Device 104, are captured by Connection Monitor 110, and their contents may also be exposed to one or more of Connection Sense Analyzers 112.

Connection Monitor 110 and/or Connection Sense Analyzers 112 determine which of External Device 104 and Protected Device 102(2) is the device that sends an initial packet to establish a connection between External Device 104 and Protected Device 102(2). The device that sends the initial packet to establish the connection is identified as the initiator device for Monitored Persistent Connection 108, and the device that received the initial packet is identified as the follower device for that connection. In the example of FIG. 1, RAT Server 105 causes Protected Device 102(2) to send an initial packet to External Device 104 to establish (i.e. open) a connection (e.g. Monitored Persistent Connection 108) between Protected Device 102(2) and External Device 104. Connection Monitor 110 and/or Connection Sense Analyzers 112 accordingly identify Protected Device 102(2) as the initiator device, and External Device 104 as the follower device, for Monitored Persistent Connection 108. In the case where Monitored Persistent Connection 108 is a TCP connection, it has end points consisting of TCP sockets on each of Protected Device 102(2) and External Device 104, where each TCP socket is made up of an IP address and port number.

As subsequent packets are conveyed between Protected Device 102(2) and External Device 104, the Connection Monitor 110 passes the packet data and/or message data that it captures on Monitored Persistent Connection 108 to Connection Sense Analyzers 112. Connection Sense Analyzers 112 analyze the captured packet and/or message data in order to detect any reverse-connection activity occurring on Monitored Persistent Connection 108. The Connection Sense Analyzers 112 detect reverse-connection activity on Monitored Persistent Connection 108 by detecting that the follower device, e.g. External Device 104, is driving communications with the initiator device, e.g. Protected Device 102(2), over Monitored Persistent Connection 108. By detecting that communications over Monitored Persistent Connection 108 are actually driven by the follower device, e.g. by External Device 104, the disclosed techniques may detect that RAT Server 105 is using Monitored Persistent Connection 108 to connect to External Device 104, so that RAT Client 107 (e.g. under the command and control of a human user of External Device 104) can use RAT Server 105 to attack Private Network 100.

In response to detecting reverse-connection activity on Monitored Persistent Connection 108, Connection Sense Analyzers 112 may generate one or more outputs indicating that the follower device is driving communications on Monitored Persistent Connection 108. For example, one or more Connection Sense Outputs 116 may be generated indicating that the follower device (i.e. External Device 104) is driving communications on Monitored Persistent Connection 108. The Connection Sense Outputs 116 may cause a notification or alert to be passed to a graphical user interface for display to a user of Network Monitor 106, e.g. to a network administrator user, and/or may cause a corrective action to be automatically taken.

Figure 4:
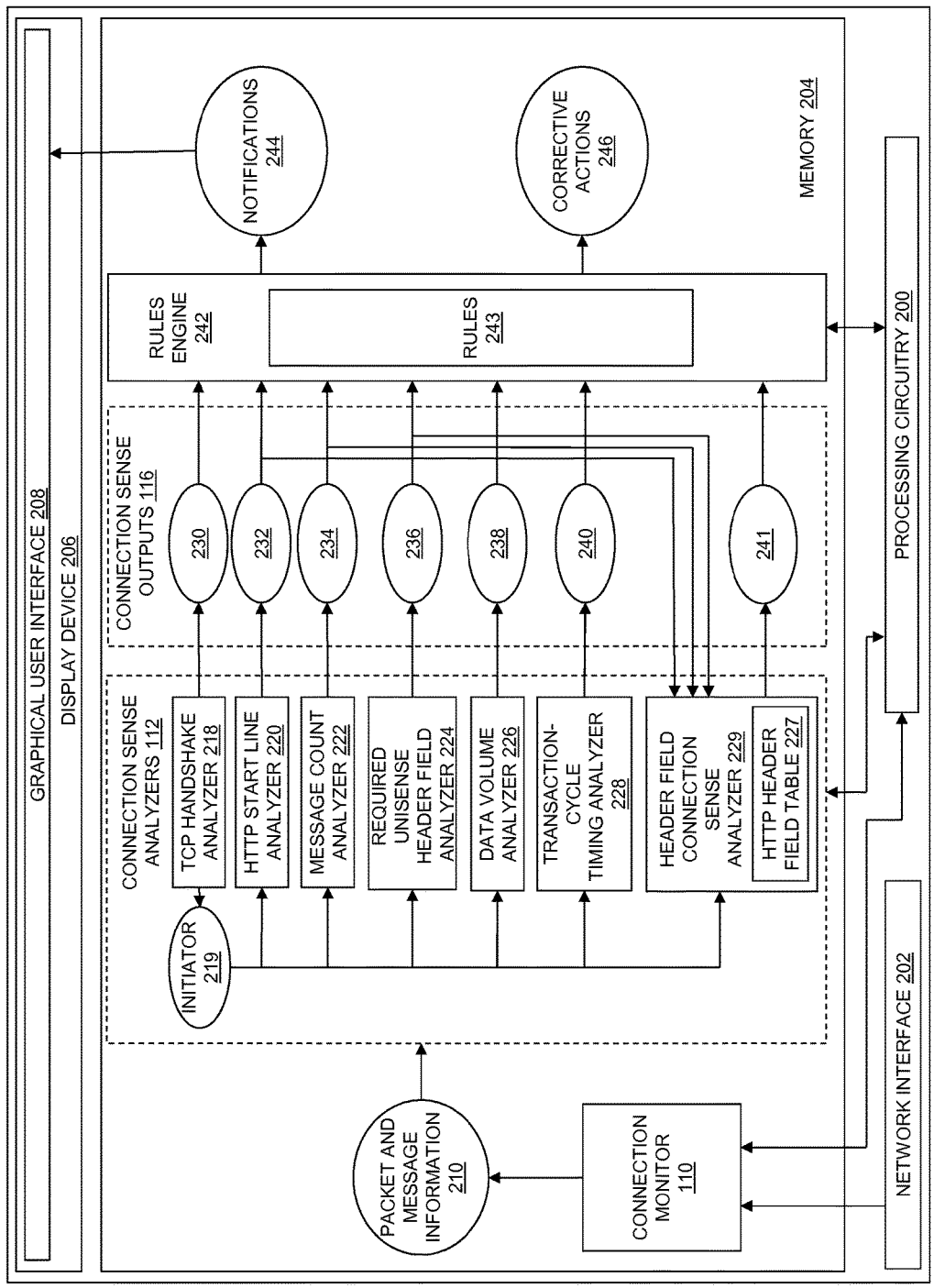
FIG. 4 is a block diagram showing further components in an illustrative embodiment of the disclosed techniques in a network monitor.

In one embodiment, and as further illustrated in FIG. 4, one or more outputs may be generated by passing one or more of Connection Sense Outputs 116 from one or more of Connection Sense Analyzers 112 to a rules engine or the like, where each of the Connection Sense Outputs 116 indicates whether a corresponding one of the Connection Sense Analyzers 112 has detected that communications over the connection are driven by the follower device. Alternatively, one or more of the Connection Sense Outputs 116 may indicate an indication of a likelihood that communications over the connection are driven by the follower device. The rules engine may then apply one or more system administration or security rules to the received Connection Sense Outputs 116 in order to determine one or more appropriate notification outputs to be generated or actions to be performed, based on the specific combination of received outputs.

While for purposes of concise illustration only a single monitored connection is shown in FIG. 1, the disclosed techniques are not so limited. Instead, Network Monitor 106 may simultaneously monitor multiple persistent connections having at least one end point located within Private LAN 100, similarly as described herein with reference to Monitored Persistent Connection 108.

In addition, while the embodiment of FIG. 1 is shown using a standalone network monitor, the disclosed techniques may alternatively be embodied wholly or in part within one or more of the Protected Devices 102, within a gateway device connecting Private LAN 100 to Internet 103, or in another specific device as appropriate for a particular deployment or implementation. In particular, they may be embodied wholly or in part in external device 104, or anywhere between the RAT client and the RAT server.

Figure 2:
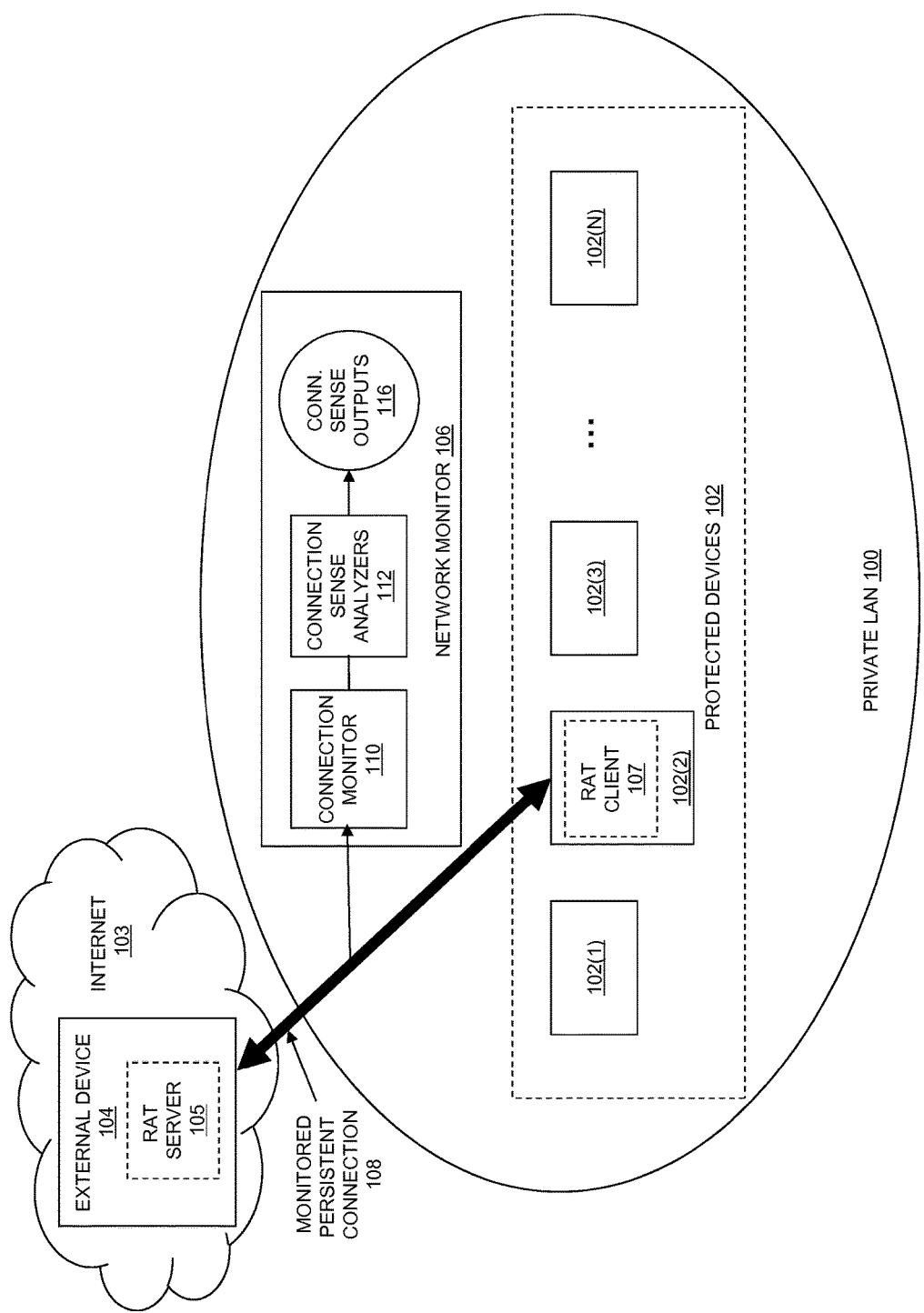
FIG. 2 is a block diagram showing components in an illustrative embodiment of the disclosed techniques detecting outbound reverse-connection activity on a monitored connection in the operational environment of FIG. 1.
Figure 3:
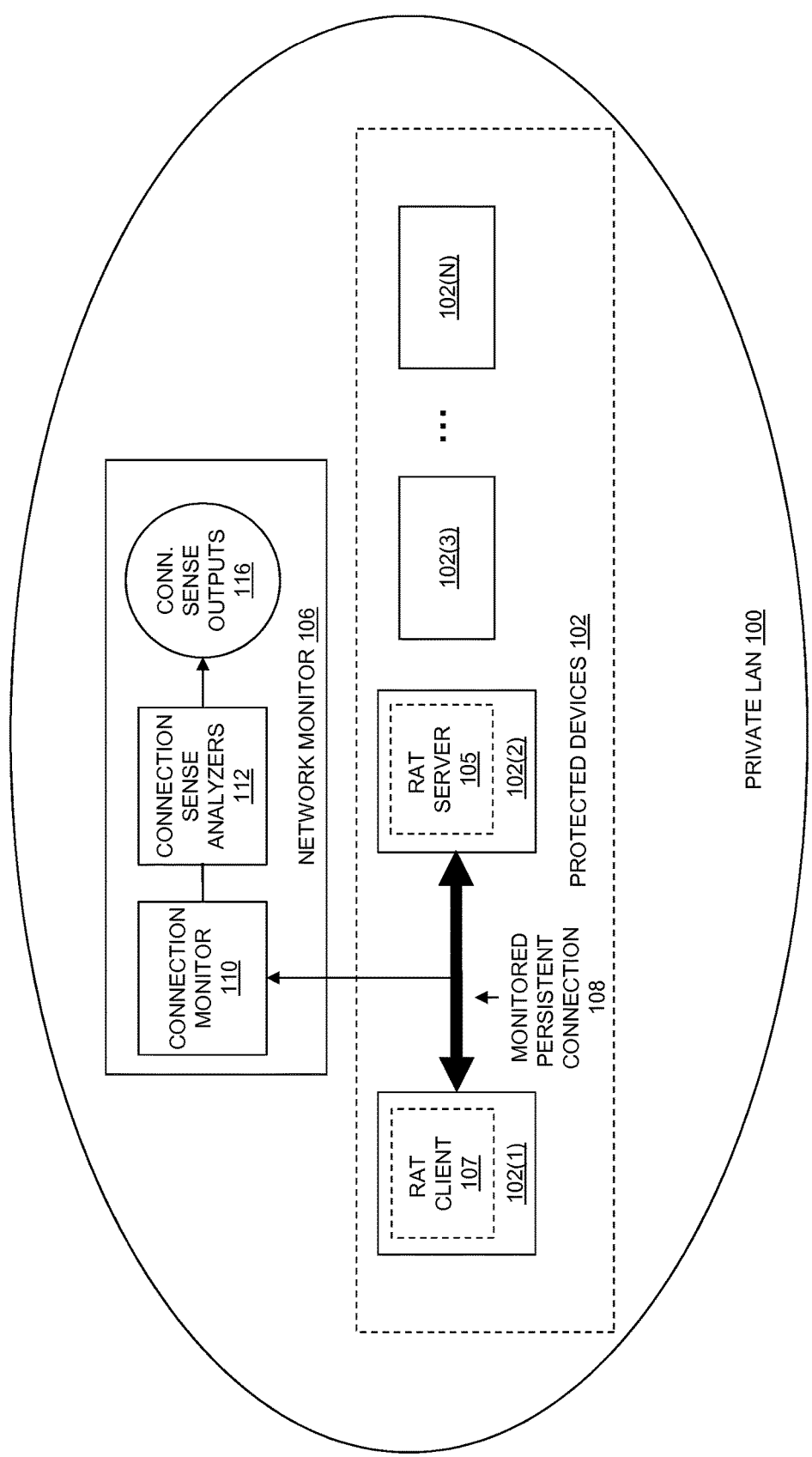
FIG. 3 is a block diagram showing components in an illustrative embodiment of the disclosed techniques detecting internal reverse-connection activity on a monitored connection in the operational environment of FIG. 1.

While the example of FIG. 1 shows detection of reverse-connection activity caused by what may be referred to as an "inbound" RAT, in which a RAT client (e.g. RAT Client 107) is located outside the protected network (e.g. within External Device 104), and the RAT server (e.g. RAT Server 105) is located inside the protected network (e.g. within Protected Device 102(2)), the disclosed techniques are not limited in this regard. As shown in FIG. 2, the disclosed techniques are also capable of detecting reverse-connection activity caused by an "outbound" RAT, in which a RAT client (e.g. RAT Client 107) is located inside the protected network (e.g. within Protected Device 102(2)), and the RAT server (e.g. RAT Server 105) is located outside the protected network (e.g. within External Device 104). Moreover, as shown in FIG. 3, the disclosed techniques are further capable of detecting reverse-connection activity caused by an "internal" RAT, in which the RAT client (e.g. RAT Client 107) is located inside the protected network (e.g. within Protected Device 102(1)), and the RAT Server (e.g. RAT Server 105) is also located inside the protected network (e.g. within Protected Device 102(2)).

FIG. 4 is a block diagram showing components in an illustrative embodiment of the disclosed techniques within the example Network Monitor 106 shown in FIG. 1. As shown in FIG. 4, Network Monitor 106 includes Processing Circuitry 200, Network Interface 202, program storage shown as Memory 204, and a Display Device 206. Display Device 206 may include or consist of any specific type of output device operable to present information in visual form, e.g. within a Graphical User Interface 208. Network Interface 202 may, for example, include or consist of one or more network interface cards (NICs) or the like, through which Network Monitor 106 is communicably connected to Private LAN 100. Processing Circuitry 200 may, for example, include or consist of one or more microprocessors or the like. Memory 204 may, for example, include or consist of any specific type of volatile or non-volatile semiconductor memory or other program storage that is operable to store programs (sequences of instructions) and/or data (e.g. program state information) for use in the Network Monitor 106.

The Memory 204 stores program logic for execution on the Processing Circuitry 200. In the illustrative embodiment of FIG. 4, Memory 204 may include packet sniffer program code, shown as Connection Monitor 110, and connection sense analyzer program code, shown as Connection Sense Analyzers 112. Program code for processing Connection Sense Outputs 116 of Connection Sense Analyzers 112 may include Rules Engine 242.

As Connection Monitor 110 captures packets and messages on Monitored Persistent Connection 108, it passes Packet and Message Information 210 to Connection Sense Analyzers 112. The Connection Sense Analyzers 112 process Packet and Message Information 210 to generate Connection Sense Outputs 116, which are passed to Rules Engine 242. Rules Engine 242 applies one or more system administration and/or security rules, shown as Rules 243, to the specific Connection Sense Outputs 116 it receives. For example, in one embodiment, each one of Connection Sense Outputs 116 may include an indication that the corresponding one of the Connection Sense Analyzers 112 has detected that communications over the monitored connection are driven by the follower device. In such an embodiment, Rules Engine 242 may apply Rules 243 to determine a specific notification output (e.g. one of Notifications 244 shown in FIG. 4) to be provided, or corrective action (e.g. one of Corrective Actions 246 shown in FIG. 4) to be performed, in response to specific sets of outputs received within Connection Sense Outputs 116. For example, in response to receipt of a first set of received outputs within Connection Sense Outputs 116 (e.g. in which at least one but less than half of the connection sense analyzers have generated an output including an indication that communications over the monitored connection are driven by the follower device), Rules Engine 242 may cause a specific notification to be passed to the Graphical User Interface 208, as shown by Notifications 244 in FIG. 4. Such a notification may, for example, include an alert for a system administrator user, indicating that Monitored Persistent Connection 108 is being used to provide communications between a RAT server (e.g. RAT Server 105) and a RAT client (e.g. RAT Client 107), and/or indicating what specific activities have been detected within communications on Monitored Persistent Connection 108 that indicate that communications on Monitored Persistent Connection 108 are being driven by the follower device. In another example, in response to a second, different set of received outputs within Connection Sense Outputs 116 (e.g. in which half or more of the connection sense analyzers have generated an output including an indication that communications over the monitored connection are driven by the follower device), Rules Engine 242 may automatically cause a corrective action to be performed, as shown by Corrective Actions 246 in FIG. 4.

Any appropriate corrective action may be taken in response to one or more indications in Connection Sense Outputs 116 that communications on Monitored Persistent Connection 108 are being driven by the follower device. In many situations, shutting down the monitored connection is not the preferred action, since such an action could cause the persons or entity responsible for the RAT to immediately suspect that that communications between the RAT client and RAT server have been detected on the monitored connection, and they could then switch to using another communication connection. Examples of corrective actions that may be taken by the disclosed system in response to one or more indications that communications on Monitored Persistent Connection 108 are being driven by the follower device include, but are not limited to, the following:

- blocking communications over Monitored Persistent Connection 108,
- throttling the data transfer rate over Monitored Persistent Connection 108,
- diverting communications over Monitored Persistent Connection 108 to a harmless, sequestered 'sandbox' execution environment,
- monitoring and analyzing the communications over Monitored Persistent Connection 108,
- identifying communication patterns or signatures in the communications over Monitored Persistent Connection 108 to look for elsewhere, e.g. as indications of RAT communications,
- monitoring actions performed by RAT Server 105,
- identifying patterns or signatures in the actions of RAT Server 105 to look for elsewhere as indications of RAT server operation,
- thwarting actions performed by RAT Server 105,
- reversing actions performed by RAT Server 105,
- altering the communications over Monitored Persistent Connection 108 with misinformation,
- alerting the external RAT host (e.g. External Device 104)
- alerting outside authorities, and/or
- disciplining personnel, in the cases of internal and outbound RATs.

In an embodiment in which one or more of Connection Sense Analyzers 112 provide a Connection Sense Output 116 that includes an indication of a level or degree of likelihood that communications over Monitored Persistent Connection 108 are driven by the follower device, Rules Engine 242 may operate based on one or more rules within Rules 243 that determine a specific notification output to be provided, or corrective action to be performed, at least in part based on specific likelihood values (e.g. between 0 and 1) that are included in such outputs generated by Connection Sense Analyzers 112. Moreover, Rules Engine 242 may be embodied and/or configured such that receipt of only a single one of Connection Sense Outputs 116 indicating that communications on the monitored connection are driven by the follower device, or indicating a specific likelihood that communications on the monitored connection are driven by the follower device, may cause a notification to be displayed to a user, and/or cause a specific corrective action to be performed.

In the illustrative embodiment of FIG. 4, Connection Sense Analyzers 112 are shown including TCP Handshake Analyzer 218, HTTP Start Line Analyzer 220, Message Count Analyzer 222, Required Unisense Header Analyzer 224, Data Volume Analyzer 226, and Transaction-Cycle Timing Analyzer 228. However, those skilled in the art will recognize that the disclosed techniques may be embodied using any combination of one or more of the specific Connection Sense Analyzers 112 shown in FIG. 4, and/or one or more other specific types of connection sense analyzers that are operable to detect that communications on the monitored connection are driven by the follower device, and that the complete set of analyzers shown in FIG. 4 is not required or necessary to provide effective detection of reverse-connection activity through the disclosed techniques. Additionally, those skilled in the art will recognize that specific aspects described with reference to specific ones of the Connection Sense Analyzers 112 may alternatively be performed by Connection Monitor 110 and/or Rules Engine 116.

TCP Handshake Analyzer 218 operates in the case where Monitored Persistent Connection 108 is a TCP connection, and detects that communications over Monitored Persistent Connection 108 are driven by the follower device (e.g. External Device 104 in FIG. 1), by detecting an attempted connection-reversal during establishment of Monitored Persistent Connection 108. When TCP Handshake Analyzer 218 detects an attempted connection reversal during establishment of Monitored Persistent Connection 108, it generates an Output 230 indicating that communications on Monitored Persistent Connection 108 are driven by the follower device (e.g. External Device 104 in FIG. 1).

Specifically, TCP Handshake Analyzer 218 operates to detect an attempted connection reversal during establishment of Monitored Persistent Connection 108 by detecting that one or more packet header bit-flags used when establishing the connection have been loaded with incorrect values. For example, TCP Handshake Analyzer 218 checks the values of the SYN and ACK single-bit flags that are included in each TCP packet transmitted on Monitored Persistent Connection 108. When Monitored Persistent Connection 108 is a TCP connection, the values of these bit-flags are used when establishing Monitored Persistent Connection 108. As defined by the TCP protocol, correct initiation of a TCP connection requires a three-step handshake:

Step 1: The initiator device transmits an initial packet with only the SYN flag set to the follower device, in order to open the connection between the initiator device and the follower device. This step provides the starting sequence number to be used to transmit data from the initiator device to the follower device over the connection.

Step 2: The follower device transmits a packet with both the SYN and ACK flags set to the initiator device. This step acknowledges the starting sequence number to be used to transmit data from the initiator device to the follower device over the connection, and provides the starting sequence number to be used to transmit data from the follower device to the initiator device over the connection. After this step the connection is set up from the initiator device to the follower device.

Step 3. The initiator device transmits a packet with only the ACK flag set to the follower device. This step acknowledges the starting sequence number to be used to transmit data from the follower device to the initiator device. After this step the connection is set up from the follower device to the initiator device.

Since RAT operation requires communication between the RAT client and the RAT server in both directions, e.g. from RAT Client 107 to RAT Server 105 and vice versa, all three steps of the handshake are necessarily performed to establish Monitored Persistent Connection 108. However, either RAT Client 107 or RAT Server 105 may attempt a connection-reversal during the handshake. For example, if the External Device 107 (on which RAT Client 107 executes) receives the initial packet from the Protected Device 102(2) in FIG. 1 (on which RAT Server 105 executes), with the initial packet correctly having only its SYN flag set, RAT Client 107 could cause External Device 107 to immediately reply to Protected Device 102(2) following receipt of the initial packet, also with a packet in which only the SYN flag is set, as opposed to replying correctly with a packet having both the SYN and ACK flags set. Such an incorrect value of the ACK flag could potentially fool an insecure implementation of the TCP connection-initiation handshake into accepting a connection in which the External Device 104 in FIG. 1 is incorrectly considered the initiator device. Accordingly, TCP Handshake Analyzer 218 operates to detect an attempted connection reversal by detecting when, subsequent to the initial packet being sent from the initiator device (e.g. Protected Device 102(2)) to the follower device (e.g. External Device 104 in FIG. 1), a packet is sent from the follower device to the initiator device that has its SYN flag set but does not have its ACK flag set, thus incorrectly indicating that the first packet sent from the follower device to the initiator device is the initial packet sent to open the connection.

Additionally, during normal TCP operation, only the first packet sent in each direction should have its SYN flag set, and every packet except the initial packet sent from the initiator device to the follower device is supposed to have the ACK flag set. The disclosed techniques identify only a transmitter of an initial packet that has its SYN flag set, but not its ACK flag set, as the initiator device for a given monitored connection. TCP Handshake Analyzer 218 further operates to detect an attempted connection reversal by detecting that that the initial packet sent from the initiator device (e.g. Protected Device 102(2)) to the follower device (e.g. External Device 104) does not have its SYN flag set, thus incorrectly indicating that the initial packet is not the first packet sent over the connection. TCP Handshake Analyzer 218 also operates to detect an attempted connection reversal by detecting when any packet sent from the initiator device (e.g. External Device 104) has both the SYN flag and the ACK flag set, thus incorrectly indicating that the initiator device is not the device that sent the initial packet to the follower device to open the connection.

In one embodiment, TCP Handshake Analyzer 218 is responsible for detecting the initiator device on the monitored connection, and also provides an output that identifies the initiator device on monitored connection, shown as Initiator 219, to the other ones of the Connection Sense Analyzers 112. Initiator 219 may, for example, include an identifier or address of the device that sent the first packet to open the monitored connection. As shown in FIG. 4, an output identifying the initiator device (e.g. Initiator 219) may be passed from TCP Handshake Analyzer 218 to each other one of the Connection Sense Analyzers 112.

HTTP Start Line Analyzer 220 operates in the case where the packets carried over Monitored Persistent Connection 108 contain HTTP (HyperText Transfer Protocol) messages. HTTP Start Line Analyzer 220 detects that communications over Monitored Persistent Connection 108 are driven by the follower device (e.g. External Device 104 in FIG. 1), by detecting that a first line of an HTTP message sent by the initiator device (e.g. Protected Device 102(2)) over the connection to the follower device has a contents indicating that the message is a response message. HTTP Start Line Analyzer 220 may also detect that communications over the connection are driven by the follower device by detecting that a first line of an HTTP message sent by the follower device over the connection to the initiator device has a contents indicating that the message is a request message. In either case, HTTP Start Line Analyzer 220 generates an Output 232 indicating that communications on Monitored Persistent Connection 108 are driven by the follower device (e.g. External Device 104).

The disclosed techniques embodied in HTTP Start Line Analyzer 220 are effective in detecting reverse-connection activity because HTTP request messages can be distinguished from HTTP response messages based on the contents of their start lines. Syntactically, according to the HTTP protocol as set forth in RFC 7230, Section 3.1, HTTP requests can be distinguished from HTTP responses only in their start line.

The start-line format for an HTTP request is as follows:
request (request line):
method SP request-target SP protocol CRLF Per the above format, the start-line for an HTTP request includes a first method field, followed by a space, followed by a request-target field, followed by a space, followed by a protocol field, followed by a carriage-return line feed. The permitted values for the method, request-target, and protocol fields in the start-line for an HTTP request are defined by RFC 7230. Specifically, method may be any of an open set of single tokens as defined in RFC 7230, Section 3.2.6, request-target is the latter part of a URI (Uniform Resource Identifier), including the path, query, and fragment fields, while excluding the initial scheme and authority fields, as defined in RFC 3986, and protocol consists of the string "HTTP/" followed by major.minor, where major and minor are unsigned decimal integers, as defined in RFC 7230 Section 2.6.

HTTP Start line Analyzer 220 checks the first line of each HTTP message conveyed over Monitored Persistent Connection 108. If an HTTP message sent by the follower device over Monitored Persistent Connection 108 has a first line with at least one field having a contents matching the definition of the field at the corresponding position within the HTTP request start-line format, then HTTP Start line Analyzer 220 detects that the contents of that field indicate that the HTTP message is a request message, and accordingly that communications over Monitored Persistent Connection 108 are driven by the follower device.

The start-line format for an HTTP response is as follows:
response (status line):
protocol SP status-code SP reason CRLF Per the above format, the start-line for an HTTP response includes a first protocol field, followed by a space, followed by a status-code field, followed by a space, followed by a reason field, followed by a carriage-return line feed. The permitted values for the protocol, status-code, and reason fields in the start-line for an HTTP response are defined by RFC 7230. Specifically, as in the HTTP request, protocol consists of the string "HTTP/" followed by major.minor, where major and minor are unsigned decimal integers, as defined in RFC 7230 Section 2.6. The contents of the status-code field is a machine-oriented 3-digit unsigned decimal integer listed in the IANA's HTTP Status Code Registry, as defined in RFC 7231, Section 6. And reason is a human-oriented text-string, conventionally in English as recommended by the reason-phrases in RFC 7231, Section 6, but substitutable by local equivalents, and possibly empty.

Also while checking the first line of each HTTP message conveyed over Monitored Persistent Connection 108, if an HTTP message sent by the initiator device over Monitored Persistent Connection 108 has a first line with at least one field having a contents matching the definition of the field at the corresponding position within the HTTP response start-line format, then HTTP Start line Analyzer 220 detects that the contents of that field indicate that the HTTP message is a response message, and accordingly that communications over Monitored Persistent Connection 108 are driven by the follower device.

Message Count Analyzer 222 operates to detect that communications over Monitored Persistent Connection 108 are driven by the follower device (e.g. External Device 104 in FIG. 1) by detecting that a running total number of HTTP messages sent from the follower device to the initiator device (e.g. Protected Device 102(2)) exceeds the running total number of HTTP messages sent from the initiator device to the follower device. When Message Count Analyzer 222 detects that a total number of HTTP messages sent from the follower device to the initiator device exceeds the total number of HTTP messages sent from the initiator device to the follower device, it generates an Output 234 indicating that communications on Monitored Persistent Connection 108 are driven by the follower device (i.e. External Device 104).

For example, in the case where Monitored Persistent Connection 108 conveys HTTP messages between the initiator device and the follower device, Connection Monitor 110 and/or Message Count Analyzer 222 count the total number of HTTP messages sent over the connection from the initiator device to the follower device, and also count the total number of messages sent over the connection from the follower device to the initiator device. Message Count Analyzer 222 then compares the total number of HTTP messages sent from the follower device to the initiator device to the total number of HTTP messages sent from the initiator device to the follower device. If the total number of HTTP messages sent from the follower device to the initiator device exceeds the total number of HTTP messages sent from the initiator device to the follower device, then Message Count Analyzer 222 detects that communications over Monitored Persistent Connection 108 are driven by the follower device.

The disclosed techniques embodied in Message Count Analyzer 222 are effective in detecting reverse-connection activity because protocols such as HTTP are request-response protocols, in which a client's request message always precedes the server's corresponding response message, if any, while the server only issues response messages in response to matching prior request messages received from the client. Accordingly, if the number of HTTP messages on a monitored connection that originated from the connection's initiator device is ever less than the number of HTTP messages that originated from the follower device, the disclosed techniques detect that communications on the connection are being driven by the follower device.

Required Unisense Header Analyzer 224 operates to detect that communications over Monitored Persistent Connection 108 are driven by the follower device (e.g. External Device 104 in FIG. 1) by detecting that either a message from the follower device includes a required request-only header field or omits a required response-only header field, or that a message from the initiator device (e.g. Protected Device 102(2)) omits a required request-only header field or includes a required request-only header field. Required request-only unisense header fields are message header fields that must be included in all and only request messages. Required response-only unisense header fields are message header fields that must be included in all and only response messages.

When Required Unisense Header Analyzer 224 detects that either i) a message from the follower device includes a required request-only header field or omits a required response-only header field, or ii) a message from the initiator device omits a required request-only header field or includes a required request-only header field, it generates an Output 236 indicating that communications on Monitored Persistent Connection 108 are driven by the follower device (i.e. External Device 104).

For example, in the case where Persistent Connection 108 conveys HTTP messages between the initiator device and the follower device using version 1.1 or later of HTTP, Connection Monitor 110 and/or Required Unisense Header Analyzer 224 check the headers in all HTTP messages conveyed between initiator device and the follower device for the presence of the "Host" header field. Versions 1.1 and later of HTTP require that the "Host" header field be included in all request messages, and permit the "Host" header field to be included only in request messages. The HTTP Host header field is thus an example of a required request-only header field. Accordingly, when Required Unisense Header Analyzer 224 detects a "Host" header field within a message sent over the monitored connection from the follower device to the initiator device, and/or when Required Unisense Header Analyzer 224 detects that a message sent over the monitored connection from the initiator device to the follower device does not contain a "Host" header field, Required Unisense Header Analyzer 224 detects that communications over the monitored connection are being driven by the follower device.

Data Volume Analyzer 226 operates to detect that communications over the Monitored Persistent Connection 108 are driven by the follower device (e.g. External Device 104 in FIG. 1) by detecting that a total volume of data sent over the connection from the initiator device (e.g. Protected Device 102(2)) to the follower device exceeds a total volume of data sent over the connection from the follower device to the initiator device. Connection Monitor 110 and/or Data Volume Analyzer 226 may be embodied to i) measure a total volume of data sent over the connection from the initiator device to the follower device, and ii) measure a total volume of data sent over the connection from the follower device to the initiator device. Data Volume Analyzer 226 then compares the total volume of data sent over the connection from the initiator device to the follower device to the total volume of data sent over the connection from the follower device to the initiator device. When Data Volume Analyzer 226 detects that the total volume of data sent over the connection from the initiator device to the follower device exceeds the total volume of data sent over the connection from the follower device to the initiator device, it generates an Output 238 indicating that communications on Monitored Persistent Connection 108 are driven by the follower device (i.e. External Device 104).

Connection Monitor 110 and/or Data Volume Analyzer 226 may alternatively be embodied to i) calculate an average message size (e.g. average HTTP message size) for messages sent over the monitored connection from the follower device to the initiator device, and ii) calculate an average message size (e.g. average HTTP message size) for messages sent over the monitored connection from the initiator device to the follower device. In such an embodiment, Data Volume Analyzer 226 may operate to detect that communications over the Monitored Persistent Connection 108 are driven by the follower device by detecting that an average message size (e.g. average HTTP message size) for messages sent over the connection from the initiator device to the follower device exceeds an average message size (e.g. average HTTP message size) for messages sent over the connection from the follower device to the initiator device.

The disclosed techniques embodied in Data Volume Analyzer 226 are effective in detecting that communications over the monitored connection are driven by the follower device because in typical client-server operation, a client almost always sends much less information than it receives from the corresponding server.

Transaction-Cycle Timing Analyzer 228 operates to detect that communications over the Monitored Persistent Connection 108 are driven by the follower device (e.g. External Device 104 in FIG. 1) by detecting that average time delays between message receipt and subsequent message transmission at the follower device exceed average time delays between message receipt and subsequent message transmission at the initiator device (e.g. Protected Device 102(2)). Connection Monitor 110 and/or Transaction-Cycle Analyzer 228 may be embodied to estimate or measure time delays between message receipt and subsequent message transmission at the initiator device, and to estimate or measure time delays between message receipt and subsequent message transmission at the follower device. Based on such estimated or measured time delays, Connection Monitor 110 and/or Transaction-Cycle Analyzer 228 may further be embodied to calculate an average time delay between message receipt and subsequent message transmission at the initiator device, and to calculate an average time delay between message receipt and subsequent message transmission at the follower device. Transaction-Cycle Analyzer 228 compares the average time delay between message receipt and subsequent message transmission at the initiator device with the average time delay between message receipt and subsequent message transmission at the follower device. When Transaction-Cycle Analyzer 228 detects that average time delays between message receipt and subsequent message transmission at the follower device exceed average time delays between message receipt and subsequent message transmission at the initiator device, it generates an Output 240 indicating that communications on Monitored Persistent Connection 108 are driven by the follower device (i.e. External Device 104).

For example, approximate time delays between message receipt and subsequent message transmission at the initiator device and at the follower device may be estimated for use by Transaction-Cycle Timing Analyzer 228 based on time stamps contained in HTTP messages conveyed over the monitored connection and captured by Connection Monitor 110, indicating times at which each message was transmitted. Such time stamps may further be used in combination with known or estimated network propagation delays to estimate delays between receipt and subsequent message transmission at the initiator device and/or follower device. Alternatively, in an embodiment in which a portion of the Connection Monitor 110 or other components embodying the disclosed techniques are located within either the initiator device (e.g. Protected Device 102(2)), and/or within the follower device (e.g. External Device 104), time delays between message receipt and subsequent message transmission may be directly measured at the respective devices.

The disclosed techniques embodied within the Transaction-Cycle Timing Analyzer 228 are effective in detecting that communications over the monitored connection are driven by the follower device because during normal client-server operation, a human operated client almost always exhibits relatively longer "deliberation" time delays between message receipt and message transmission, in comparison to the relatively shorter "service" time delays between message receipt and message transmission exhibited by the server. Such relatively longer deliberation delays are caused by the human operator reading the contents of the previously received message contents, and determining a next message to be sent from the RAT client to the RAT server. Accordingly, detecting that average time delays between message receipt and subsequent message transmission at the follower device exceed the average time delays between message receipt and subsequent message transmission at the initiator device indicates that communications over a monitored connection are being driven by a human-operated follower device that is actually hosting a RAT client (e.g. RAT client 107).

Header Connection Sense Analyzer 229 operates to detect that communications over the Monitored Persistent Connection 108 are driven by the follower device (e.g. External Device 104) by detecting that an HTTP message conveyed over Monitored Persistent Connection 108 includes one or more header fields that are inconsistent with the origin of the message, based either on the definition of the header in the HTTP protocol, or on the likely types of the messages in which the header field was previously detected in communications across multiple monitored connections.

Specifically, Header Connection Sense Analyzer 229 examines the header fields contained in each HTTP message conveyed over Monitored Persistent Connection 108. If a header field detected in an HTTP message sent from the follower device (e.g. External Device 104) to the initiator device (e.g. Protected Device 102(2))

i) is defined by the HTTP protocol to be valid only in HTTP request messages, or ii) has previously been detected only in one or more messages that are likely request messages in communications across multiple monitored connections, then Header Connection Sense Analyzer 229 detects that the follower device is driving communications on the monitored connection, and generates an Output 241 indicating that communications on the monitored connection are driven by the follower device.

For example, Header Connection Sense Analyzer 229 may operate to detect that a header field detected in an HTTP message sent from the follower device to the initiator device is defined by the HTTP protocol to be valid only in HTTP request messages using HTTP Header Table 227. HTTP Header Table 227 may consist of a number of table entries, where each entry corresponds to an HTTP header field, and indicates whether, based on the HTTP specification, the HTTP header field corresponding to the entry i) is valid only in request messages, ii) is valid only in response messages, or iii) is valid in both request and response messages. The contents of HTTP Header Table 227 may be loaded based on current lists of permanent and provisional HTTP header fields that are maintained by the IANA (Internet Assigned Numbers Authority), and based on the HTTP protocol specification. The entries stored in HTTP Header Table 227 identify certain HTTP header fields that are defined by the HTTP protocol to be valid only in request messages, and certain other HTTP header fields that are defined by the HTTP protocol to be valid only in response messages. Such header fields are referred to herein as "defined unisense headers".

In order to determine whether a message header field has previously been detected only in one or more messages that are likely request messages, the Connection Monitor 110 and/or Header Connection Sense Analyzer 229 may maintain, for each detected header field, a first count equal to the total number of times the header field was detected in messages that are likely request messages that were captured across multiple monitored connections. For example, for each header field, the first count may be equal to the total number of times the header field was detected in a) HTTP messages sent from an initiator device to a follower device on any of the multiple monitored connections for which no indication (e.g. connection sense output) has been generated that the follower device is driving communications on the connection, or b) HTTP messages sent from a follower device to an initiator device on any of the multiple monitored connections for which at least one indication (e.g. connection sense output) has been generated that the follower device is driving communications on the connection.

In order to support the above determinations, outputs of one or more of the Connection Sense Outputs 116 generated by the other Connection Sense Analyzers 112 may be passed to the Header Connection Senses Analyzer 229. For example, in the embodiment of FIG. 4, Connection Sense Outputs 232, 234 and 236 are shown being passed to Header Connection Sense Analyzer 229.

The Connection Monitor 110 and/or Header Connection Sense Analyzer 229 may also maintain, for each detected header field, a second count equal to the total number of times the header field was detected in messages that are likely response messages that were captured across multiple monitored connections. For example, for each detected header field, the second count may be equal to the total number of times the header field was detected in a) HTTP messages sent from a follower device to an initiator device on any of the multiple monitored connections for which no indication (e.g. connection sense output) has been generated that the follower device is driving communications on the connection, and/or b) HTTP messages sent from initiator devices to follower devices on any of the multiple monitored connections for which at least one indication (e.g. connection sense output) has been generated that the follower device is driving communications on the connection. To increase the statistical precision and reduce susceptibility of deliberate bias, these counts may advantageously be federated among multiple network monitors.

Accordingly, for a header field detected in an HTTP message sent from the follower device (e.g. External Device 104) to the initiator device (e.g. Protected Device 102(2)), the Header Connection Sense Analyzer 229 may determine whether the header field has previously been detected only in one or more messages that are likely request messages based on the values of the first count and the second count that are maintained by the Header Connection Sense Analyzer 227 for that header field.

Similarly, if a header field detected in an HTTP message sent from the initiator device (e.g. Protected Device 102(2)) to the follower device (e.g. External Device 104)

i) is defined by the HTTP protocol to be valid only in HTTP response messages, or ii) has previously been detected only in one or more messages that are likely response messages, then Header Connection Sense Analyzer 229 also detects that the follower device is driving communications on the monitored connection, based on the entry corresponding to the header field in HTTP Header Table 227, and/or based on the first and second counts maintained for header by Header Connection Sense Analyzer 229, and generates an Output 241 indicating that communications on the monitored connection are driven by the follower device.

While the embodiments shown in FIGS. 1-4 are described above with reference to Connection Sense Outputs 116 that may provide discrete and definitive indications of whether a follower device is driving communications on a monitored connection, this is only one possible approach, and the disclosed techniques are not limited to providing such outputs. For example, in one embodiment, one or more of the Connection Sense Outputs 116 may provide discrete and definitive outputs such as a value of "1" indicating that the corresponding one of the Connection Sense Analyzers 112 has definitively determined that the follower device is driving communications on the monitored connection, or a value of "0" indicating that the corresponding one of the Connection Sense Analyzers 112 has made no determination that the follower device is driving communications on the monitored connection. Alternatively, or in addition, one or more of the Connection Sense Outputs 116 may provide likelihood values, indicating a level or degree of likelihood that the follower device is driving communications on the monitored connection. For example, in such an alternative embodiment, one or more of the Connection Sense Outputs 116 may have a value ranging between 0 and 1, with higher values indicating a greater likelihood that the follower device is driving communications on the monitored connection, and lower values indicating a lesser likelihood that the follower device is driving communications on the monitored connection.

It should further be understood that the disclosed system may be embodied or configured for real-time detection and/or non-real time detection of reverse-connection activity. For real-time detection, each of the connection sense analyzers 112 updates, and may potentially generate their respective one of connection sense outputs 116, after every transaction (e.g. packet or message) on the monitored connection. Accordingly, an appropriate alert may be provided through Notifications 244, or an appropriate one of Corrective Actions 246 may be taken, after every transaction.

For non-real-time detection, one or more of the per-transaction Connection Sense Outputs 116 for the monitored connection may be summarized in a session digest provided in Notifications 244. For Connection Sense Analyzers 112 that provide logically definitive indications of reverse-connection activity (e.g. TCP Handshake Analyzer 218, HTTP Start Line Analyzer 220, Message Count Analyzer 222, Required Unisense Header Field Analyzer 224, and Header Field Connection Sense Analyzer 229 with regard to defined unisense headers), the session digest may summarize the communication session with data such as a maximum reverse-sense indication (e.g. maximum value of a respective one of Connection Sense Outputs 116 over the session), and a total number of reverse-sense indications (e.g. total number of non-zero values for a respective one of Connection Sense Outputs 116). For one or more of the Connection Sense Analyzers 112 that provide statistical indications of reverse-connection activity (e.g. Data Volume Analyzer 226, Transaction-Cycle Timing Analyzer 228, and Header Field Connection Sense Analyzer 229 with regard to header fields other than defined unisense headers), the session digest may summarize the communication session with data such as the maximum reverse-sense indication and a final reverse-sense indication (e.g. a final value for a respective one of Connection Sense Outputs 116).

In addition, while the examples of FIGS. 1-4 show the disclosed techniques embodied within a Network Monitor 106 that is located separately from the Protected Devices 102 in the Private LAN 100, the disclosed techniques may alternatively be embodied wholly or in part within one or more of the Protected Devices 102.

Figure 5:
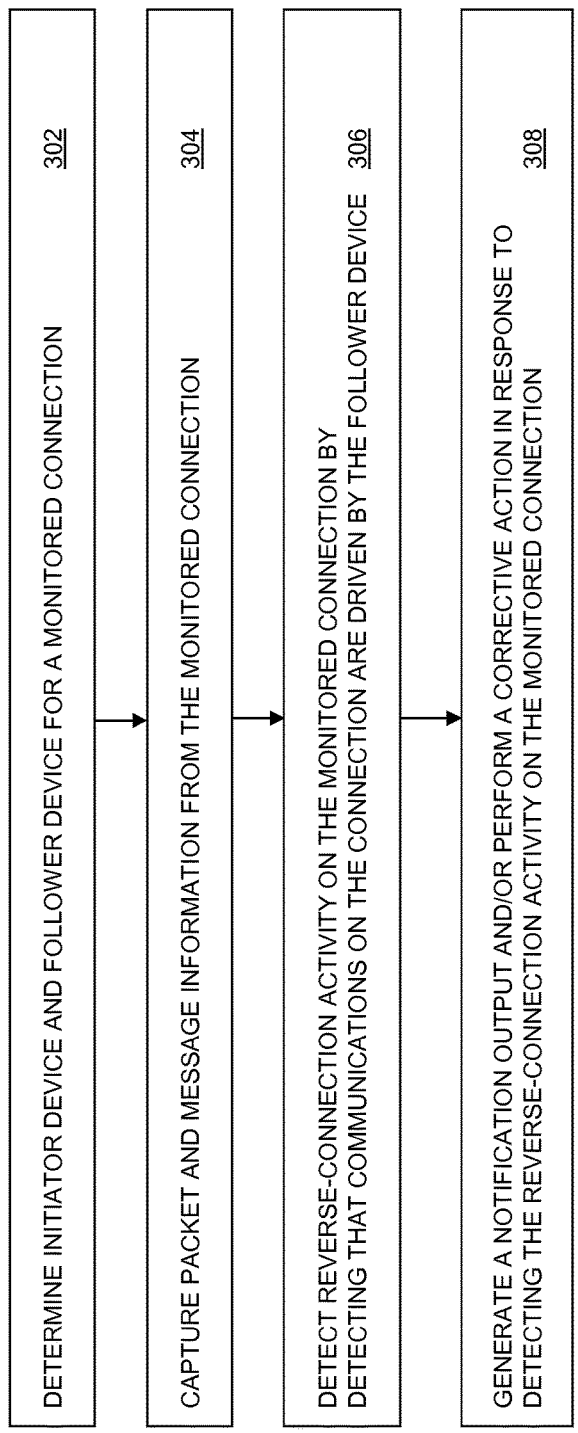
FIG. 5 is a flow chart showing an example of steps performed by an illustrative embodiment of the disclosed techniques to detect reverse-connection activity.

FIG. 5 is a flow chart showing an example of steps performed by an illustrative embodiment of the disclosed techniques to detect reverse-connection activity. The steps of FIG. 5 may, for example, be performed by one or more components of the Network Monitor 106 shown in FIGS. 1-4. At step 302, an initiator device and a follower device are identified for a monitored connection. For example, the initiator device may be identified as the device that sends an initial packet to set up the connection, and the follower device may be identified as the device that receives the initial packet from the initiator device.

At step 304, packet and/or message data conveyed over the monitored connection is captured. At step 306, the disclosed system detects reverse-connection activity on the monitored connection by detecting that communications on the connection are driven by the follower device. In response to detecting that communications on the connection are driven by the follower device, at step 308 a notification output is generated and/or a corrective action is performed. The notification output may, for example, provide an alert to a system manager user or the like indicating that reverse-connection activity has been detected on the monitored connection, and that accordingly a RAT may be using the monitored connection. The corrective action may, for example, consist of or include preventing further communications on the monitored connection.

Figure 6:
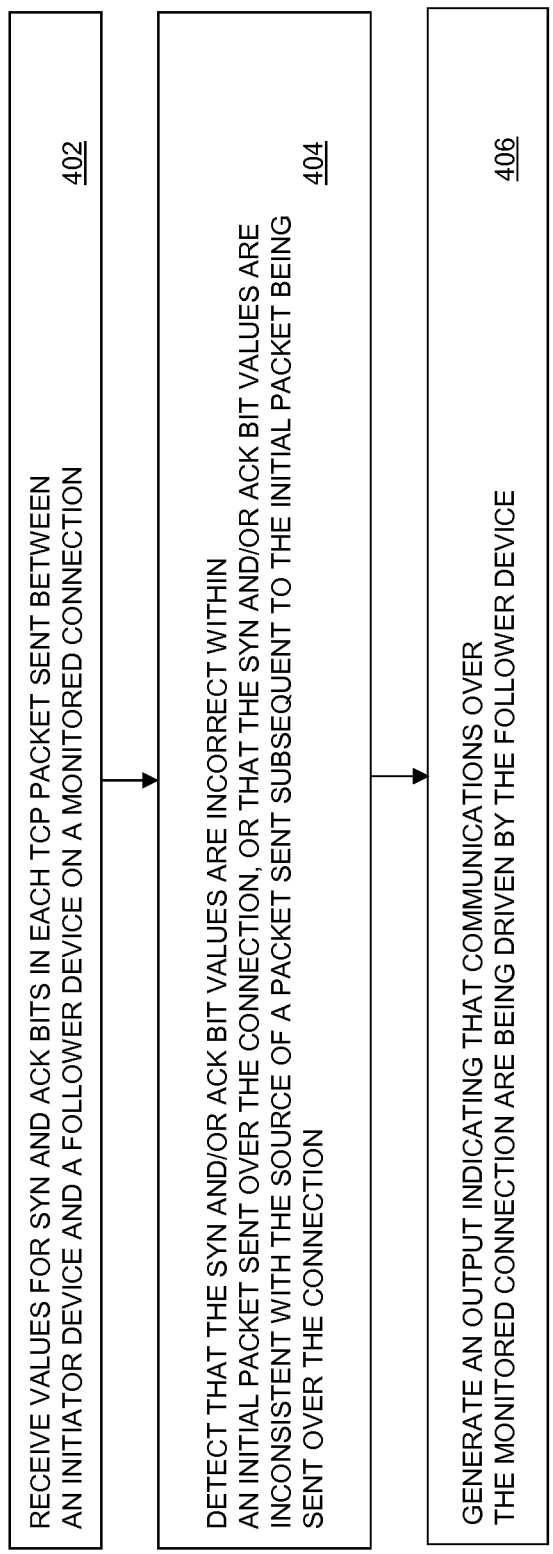
FIG. 6 is a flow chart showing an example of steps performed in an illustrative embodiment to detect that communications on a monitored connection are driven by a follower device based on the values of bits in the headers of packets sent to establish the monitored connection.

FIG. 6 is a flow chart showing an example of steps performed in an illustrative embodiment to detect that communications on a monitored connection are driven by a follower device based on the values of single-bit flags in the headers of packets sent to establish the monitored connection. The steps of FIG. 6 may, for example, be performed in whole or in part by the Connection Monitor 110 and/or TCP Handshake Analyzer 218 shown in FIG. 4. At step 402, values are received for TCP header bit-flags SYN and ACK in each TCP packet sent between an initiator device and a follower device on a monitored connection.

At step 404, the disclosed system detects that the SYN and/or ACK flag values are incorrect within an initial packet sent over the monitored connection, or that the SYN and/or ACK bit-flag values are inconsistent with the source of a packet sent subsequent to the initial packet being sent over the connection.

At step 406, in response to detecting that the SYN and/or ACK bit-flag values are incorrect within the initial packet sent over the monitored connection, or that the SYN and/or ACK bit-flag values are inconsistent with the source of a packet sent subsequent to the initial packet being sent over the connection, an output is generated indicating that communications over the monitored connection are being driven by the follower device.

Figure 7:
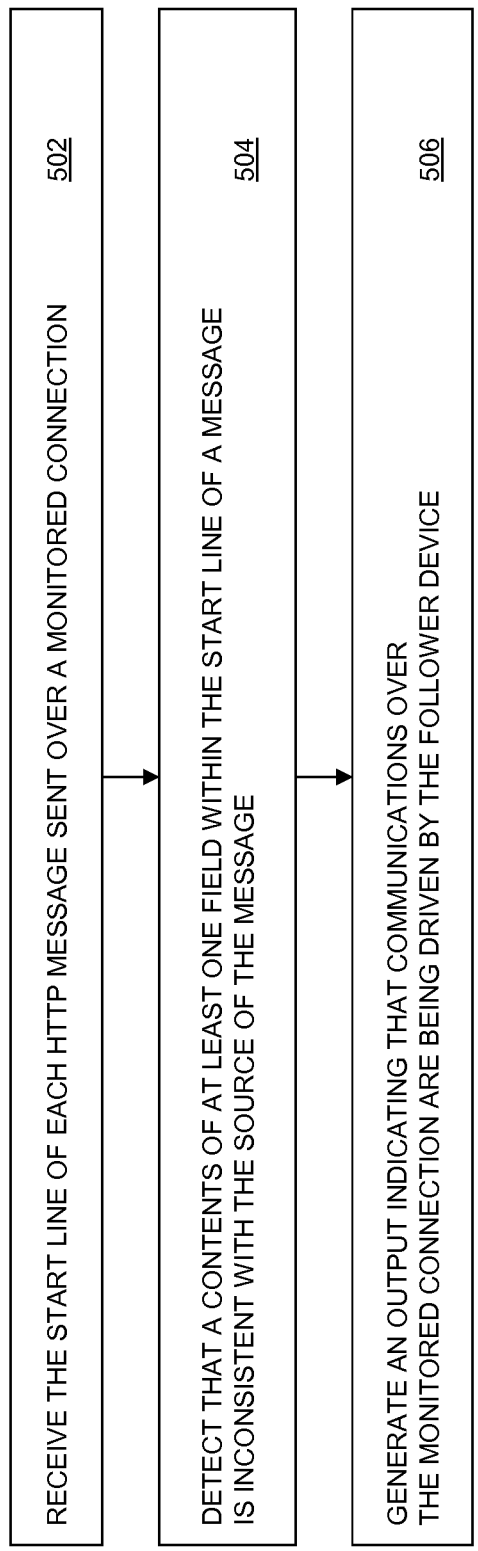
FIG. 7 is a flow chart showing an example of steps performed in an illustrative embodiment to detect that communications on a monitored connection are driven by a follower device based on the contents of at least one field in a start line of an HTTP message sent on the monitored connection.

FIG. 7 is a flow chart showing an example of steps performed in an illustrative embodiment to detect that communications on a monitored connection are driven by a follower device based on the contents of at least one field in a start line of an HTTP message sent on the monitored connection. The steps of FIG. 7 may, for example, be performed in whole or in part by the Connection Monitor 110 and/or the HTTP Start Line Analyzer 220 shown in FIG. 4. At step 502, a start line is received for each HTTP message sent over a monitored connection. At step 504, the disclosed system detects that the contents of at least one field within the start line of a message on the monitored connection is inconsistent with the source of the message.

In response to detecting that the contents of at least one field within the start line of a message is inconsistent with the source of the message, at step 506 an output is generated indicating that communications over the monitored connection are driven by the follower device for the connection.

Figure 8:
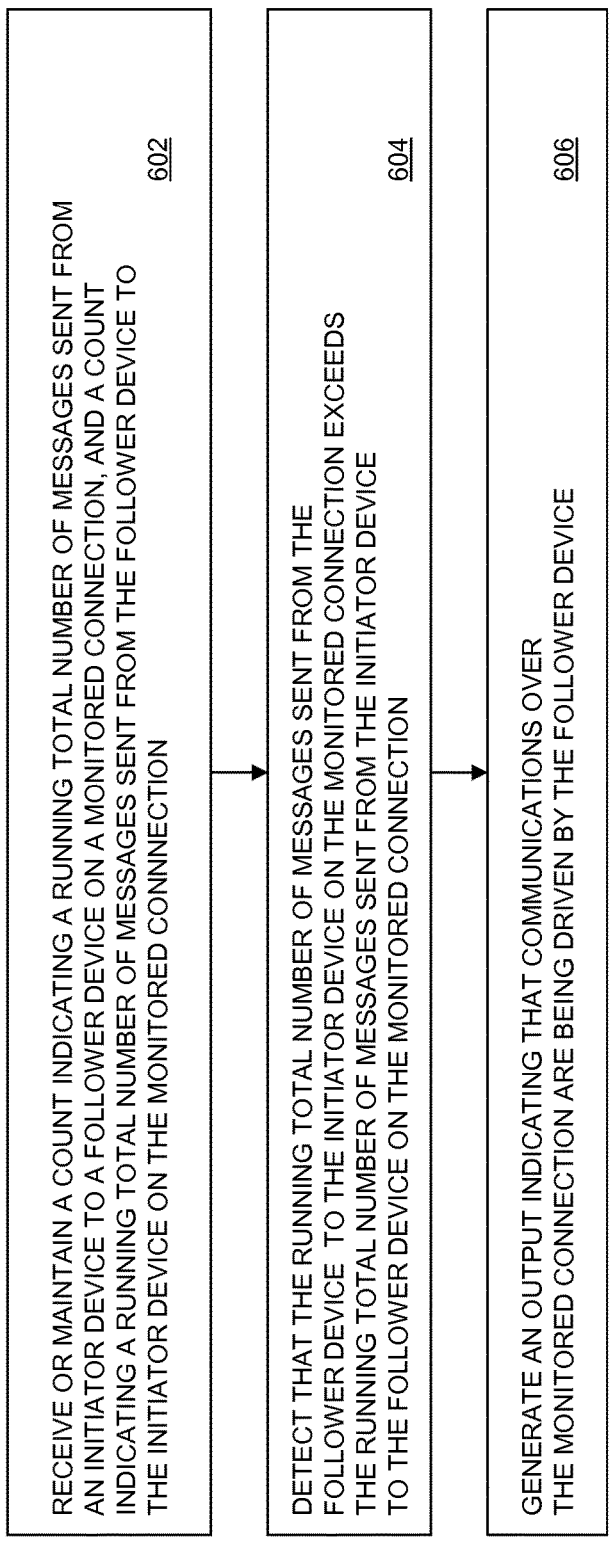
FIG. 8 is a flow chart showing an example of steps performed in an illustrative embodiment to detect that communications on a connection are driven by a follower device based on a comparison of the running total number of messages sent from the follower device to the initiator device to the running total number of messages sent from the initiator device to the follower device.

FIG. 8 is a flow chart showing an example of steps performed in an illustrative embodiment to detect that communications on a connection are driven by a follower device based on a comparison of the running total number of messages sent from the follower device to the initiator device to the running total number of messages sent from the initiator device to the follower device. The steps of FIG. 8 may, for example, be performed in whole or in part by the Connection Monitor 110 and/or the Message Count Analyzer 222 shown in FIG. 4. At step 602, the disclosed system receives or maintains a count indicating a running total number of messages sent from an initiator device to a follower device on a monitored connection, and a count indicating a running total number of messages sent from the follower device to the initiator device on the monitored connection. At step 604, the disclosed system detects that the running total number of messages sent from the follower device to the initiator device on the monitored connection exceeds the running total number of messages sent from the initiator device to the follower device on the monitored connection. At step 606, in response to detecting that the running total number of messages sent from the follower device to the initiator device on the monitored connection ever exceeds the running total number of messages sent from the initiator device to the follower device on the monitored connection, an output is generated indicating that communications over the monitored connection are driven by the follower device for the connection.

Figure 9:
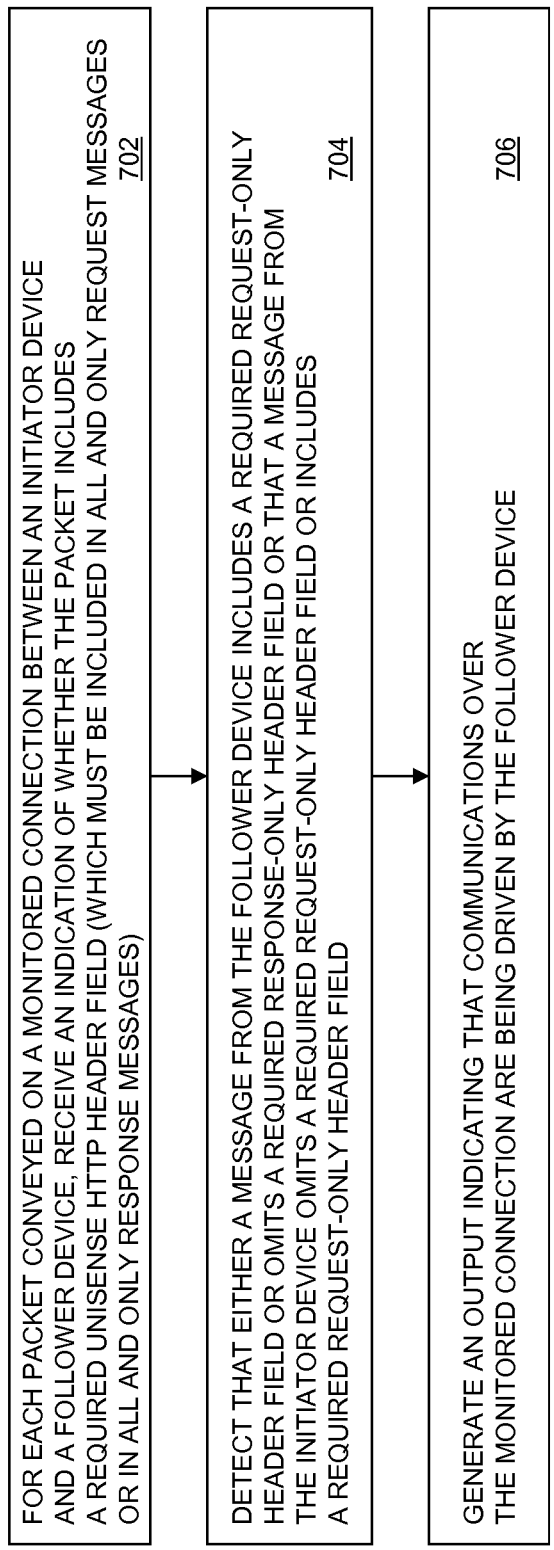
FIG. 9 is a flow chart showing an example of steps performed in an illustrative embodiment to detect that communications on a connection are driven by a follower device based on finding that either i) a message from the follower device includes a required request-only header field or omits a required response-only header field, or ii) a message from the initiator device omits a required request-only header field or includes a required request-only header field.

FIG. 9 is a flow chart showing an example of steps performed in an illustrative embodiment to detect that communications on a connection are driven by a follower device by checking the direction in which packets are sent that contain required "unisense" header fields. Required unisense header fields are message header fields which either i) must be included in all and only request messages, or ii) must be included in all and only response messages.

One example of a required unisense header field is the HTTP "Host" header field. The HTTP Host header field is required to be included in all request messages, and must only be included in request messages, per version 1.1 or later of the HTTP protocol. Thus the HTTP Host Header field is an example of a unisense header field that is a required, request-only header field. The contents of the HTTP Host header field specify the Internet host (e.g. domain name), and optionally the port number, of the resource being requested.

While the HTTP "Host" header field is an example of a unisense HTTP header field, the disclosed techniques are generally applicable to any specific required unisense header field, and may be applied to any other required unisense header fields, as appropriate for other communication protocols and/or versions of the HTTP protocol.

The steps of FIG. 9 may, for example, be performed in whole or in part by the Connection Monitor 110 and/or the Required Unisense Header Analyzer 224 shown in FIG. 4.

In the example of FIG. 9, at step 702, each packet conveyed on the monitored connection between the initiator device and a follower device is checked to determine whether the packet includes a required unisense HTTP header field. For example, at step 702 the disclosed system may detect an HTTP host header field in a packet conveyed on the monitored connection.

At step 704, the disclosed system detects that either a message from the follower device includes a required request-only header field or omits a required response-only header field, or that a message from the initiator device omits a required request-only header field or includes a required request-only header field. For example, at step 704 the disclosed system may detect that a message from the initiator device includes a required request-only header field by detecting that the packet detected at step 702 containing the HTTP host header field was transmitted from the initiator device.

In response to detecting at step 704 that either a message from the follower device includes a required request-only header field or omits a required response-only header field, or that a message from the initiator device omits a required request-only header field or includes a required request-only header field, at step 706 the disclosed system generates an output indicating that communications over the monitored connection are driven by the follower device for the connection.

Figure 10:
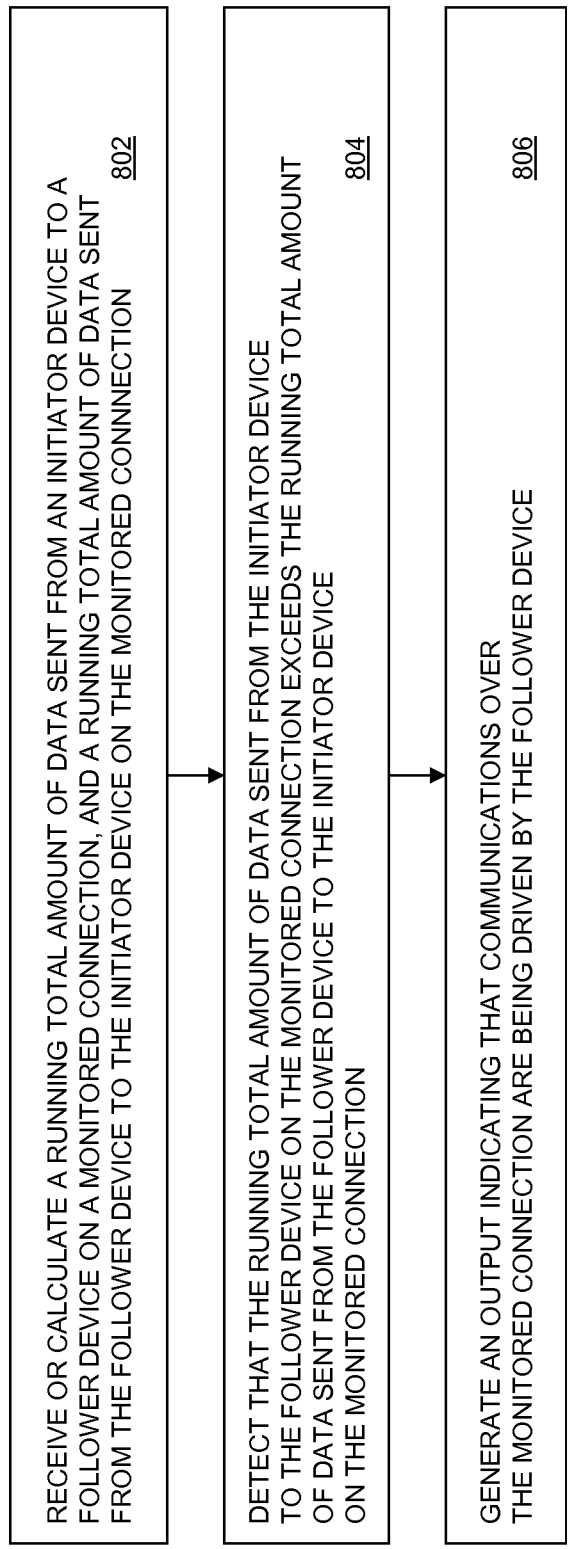
FIG. 10 is a flow chart showing an example of steps performed in an illustrative embodiment to detect that communications on a connection are driven by a follower device based on comparing a running total amount of data sent from the initiator device to the follower device to a running total amount of data sent from the follower device to the initiator device.

FIG. 10 is a flow chart showing an example of steps performed in an illustrative embodiment to detect that communications on a connection are driven by a follower device based on comparing a running total amount of data sent from the initiator device to the follower device to a running total amount of data sent from the follower device to the initiator device. The steps of FIG. 10 may, for example, be performed in whole or in part by the Connection Monitor 110 and/or the Data Volume Analyzer 226 shown in FIG. 4. At step 802, the disclosed system receives or calculates a running total amount of data sent from an initiator device to a follower device on a monitored connection, and a running total amount of data sent from the follower device to the initiator device on the monitored connection. At step 804, the disclosed system detects that, at any point in time after the first message is sent from the follower device to the initiator device, the running total amount of data sent from the initiator device to the follower device on the monitored connection exceeds the running total amount of data sent from the follower device to the initiator device on the monitored connection. In response to detecting, at a point in time after the first message is sent from the follower device to the initiator device, that the running total amount of data sent from the initiator device to the follower device on the monitored connection exceeds the running total amount of data sent from the follower device to the initiator device on the monitored connection, at step 806 the disclosed system generates an output indicating that communications over the monitored connection are being driven by the follower device.

Figure 11:
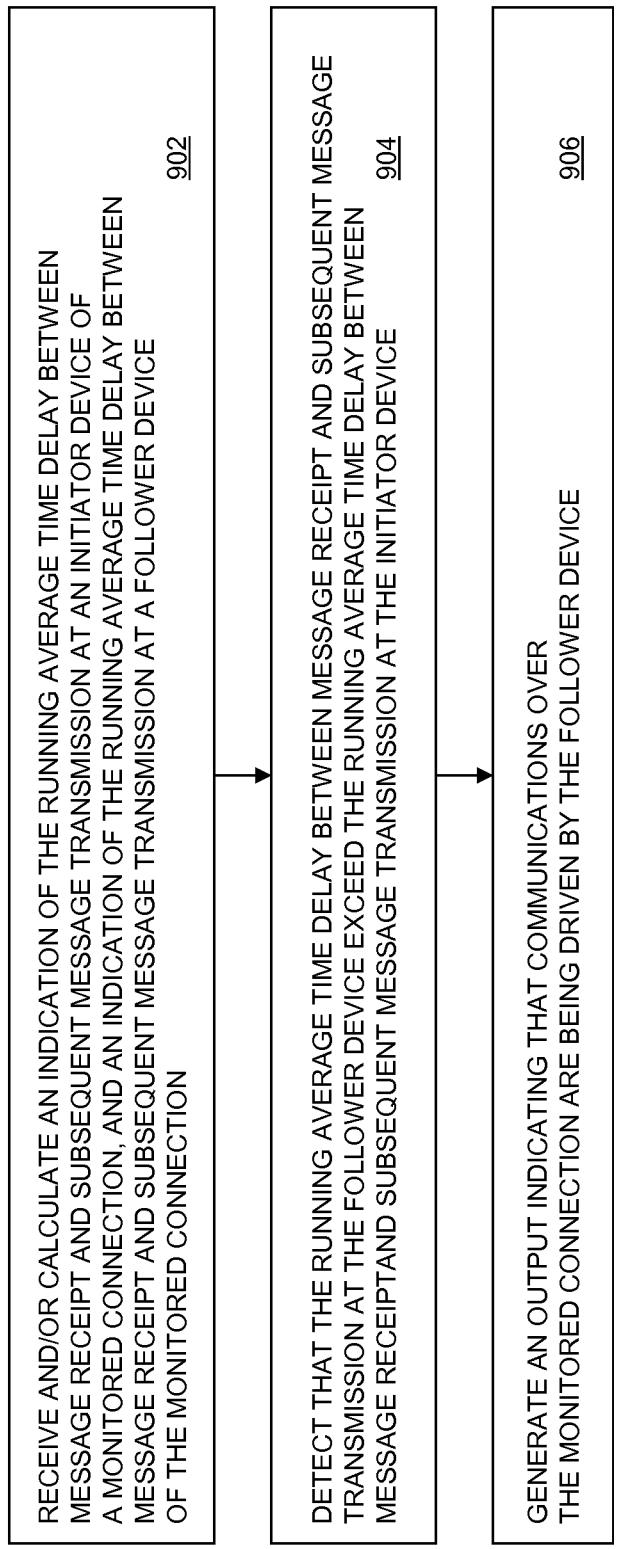
FIG. 11 is a flow chart showing an example of steps performed in an illustrative embodiment to detect that communications on a connection are driven by a follower device based on comparing time delays between message receipt and subsequent message transmission at the follower device with time delays between message receipt and subsequent message transmission at the initiator device.

FIG. 11 is a flow chart showing an example of steps performed in an illustrative embodiment to detect that communications on a connection are driven by a follower device based on comparing time delays between message receipt and subsequent message transmission at the follower device with time delays between message receipt and subsequent message transmission at the initiator device. The steps of FIG. 11 may, for example, be performed in whole or in part by the Connection Monitor 110 and/or the Transaction-Cycle Timing Analyzer 228 shown in FIG. 4. At step 902, the disclosed system receives and/or calculates an indication of the running average time delay between message receipt and subsequent message transmission at an initiator device of a monitored connection, and an indication of the running average time delay between message receipt and subsequent message transmission at a follower device of the monitored connection. At step 904, the disclosed system detects that the running average time delay between message receipt and subsequent message transmission at the follower device exceed the running average time delay between message receipt and subsequent message transmission at the initiator device. In response to detecting that the running average time delay between message receipt and subsequent message transmission at the follower device ever exceeds the running average time delay between message receipt and subsequent message transmission at the initiator device, at step 906 the disclosed system generates an output indicating that communications over the monitored connection are being driven by the follower device.

Figure 12:
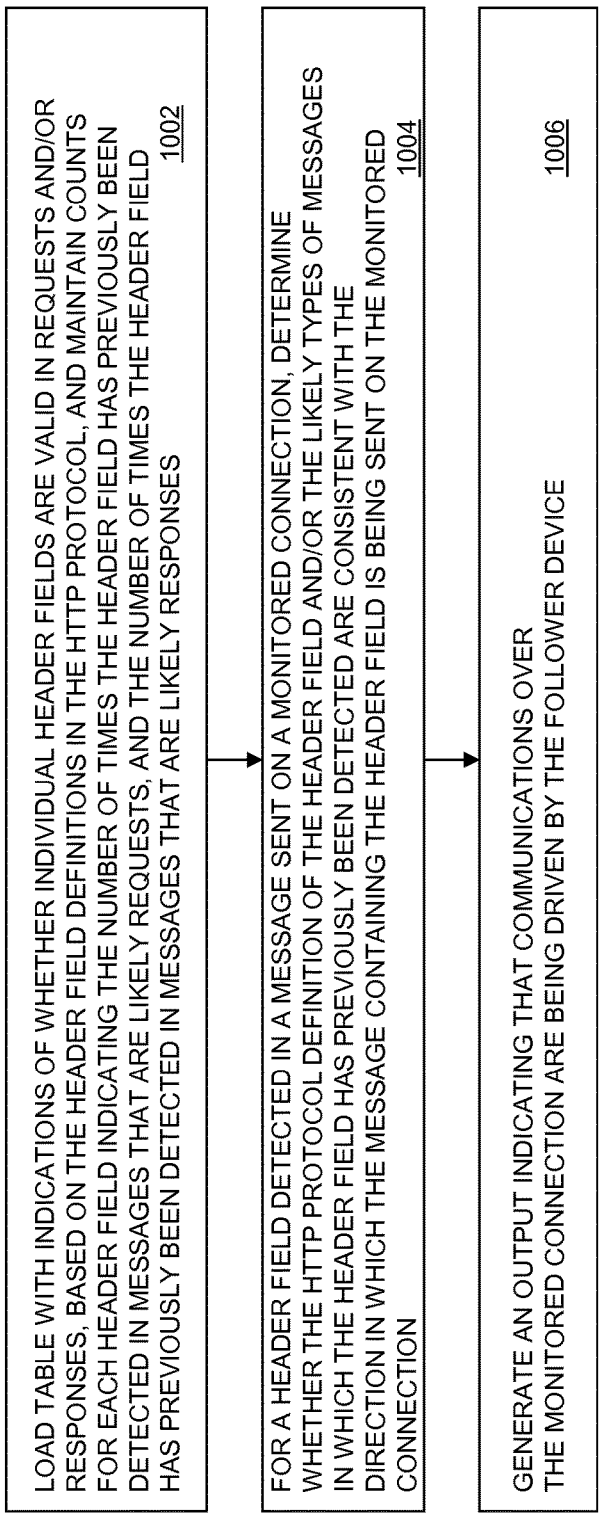
FIG. 12 is a flow chart showing an example of steps performed in an illustrative embodiment to detect that communications on a connection are driven by a follower device based on whether a message conveyed over the connection includes one or more header fields that are inconsistent with the origin of the message, based either on the definition of the header field in the HTTP protocol, or on the likely types (i.e. request or response) of messages in which the header field was previously detected.

FIG. 12 is a flow chart showing an example of steps performed in an illustrative embodiment to detect that communications on a connection are driven by a follower device based on whether a message conveyed over the connection includes one or more header fields that are inconsistent with the origin of the message, based either on the definition of the header field in the HTTP protocol, or on the likely types of messages in which the header field was previously detected. The steps of FIG. 12 may, for example, be performed in whole or in part by the Connection Monitor 110 and/or the Header Connection Sense Analyzer 229 shown in FIG. 4. At step 1002, the disclosed system loads a table with indications of whether individual header fields are valid in requests and/or responses, based on the header field definitions in the HTTP protocol. Further at step 1002, the disclosed system maintains counts for each header field indicating the number of times the header field has previously been detected in messages that are likely requests, and the number of times the header field has previously been detected in messages that are likely responses. The counts maintained at step 1002 may, for example, reflect communications captured across multiple monitored connections.

At step 1004, for a header field detected in a message sent on a monitored connection, the disclosed system determines whether the HTTP protocol definition of the header field (e.g. as loaded into the table in step 1002), and/or the likely types of messages in which the header field has previously been detected (e.g. as indicated by the counts maintained in step 1002), are consistent with the direction in which the message containing the header field is being sent on the monitored connection. Specifically, if a header field detected in a message sent from the follower device to the initiator device i) is defined by the HTTP protocol to be valid only in HTTP request messages, or ii) has previously been detected only in one or more messages that are likely request messages, then the disclosed system detects that the follower device is driving communications on the monitored connection, and at step 1006 generates an output indicating that communications on the monitored connection are driven by the follower device. Similarly, if a header field detected in a message sent from the initiator device to the follower device i) is defined by the HTTP protocol to be valid only in HTTP response messages, or ii) has previously been detected only in one or more messages that are likely response messages, then the disclosed system detects that the follower device is driving communications on the monitored connection, and at step 1006 generates an output indicating that communications on the monitored connection are driven by the follower device.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of protecting a network from advanced persistent threats by detecting malicious remote-administration-tools, comprising executing, on at least one processor of a network monitor device located within the network, the steps of:
    monitoring, by the network monitor device, communications over a persistent connection traversing at least a portion of the network, the connection operable to carry packets between an initiator device and a follower device, the initiator device having sent a first packet to the follower device to open the connection, wherein the monitoring of the communications over the connection includes capturing each packet communicated between the initiator device and the follower device subsequent to the connection being opened;
    detecting, by the network monitor device, reverse-connection activity on the connection in response to the monitoring of the communications over the connection by, at least in part, detecting, responsive to packet data contained in each packet communicated between the initiator device and the follower device subsequent to the connection being opened, that the communications over the connection are driven by the follower device, wherein detecting reverse-connection activity on the connection indicates that the follower device is a client component of a malicious remote-administration-tool and that the initiator device is a server component of the malicious remote-administration-tool; and
    generating, by the network monitor device in response to detecting the reverse-connection activity on the connection, an output indicating that the malicious remote-administration-tool is using the connection.

2. The method of claim 1, wherein monitoring communications over the persistent connection includes inputting at least one flag contained in a header of the first packet sent from the initiator device to the follower device to open the connection; and
    wherein detecting that communications over the connection are driven by the follower device includes detecting an attempted connection-reversal during establishment of the connection by detecting that the flag contained in the header of the first packet sent from the initiator device to the follower device to open the connection indicates that the first packet sent from the initiator device to the follower device to open the connection is not the first packet transmitted on the connection.

3. The method of claim 1, wherein monitoring communications over the persistent connection includes inputting at least one flag contained in a header of a first packet sent from the follower device to the initiator device over the connection; and
    wherein detecting that communications over the connection are driven by the follower device includes detecting an attempted connection-reversal during establishment of the connection by detecting that the flag contained in the header of the first packet sent from the follower device to the initiator device over the connection indicates that the first packet sent from the follower device to the initiator device over the connection is the first packet sent over the connection.

4. The method of claim 1, wherein monitoring communications over the persistent connection includes inputting contents of at least one field in a first line of a message contained in a packet sent by the initiator device over the connection to the follower device; and
    wherein detecting that communications over the connection are driven by the follower device includes detecting that communications over the connection are driven by the follower device by detecting that the contents of the field in the first line of the message contained in the packet sent by the initiator device over the connection to the follower device indicates that the message is a response message.

5. The method of claim 1, wherein monitoring communications over the persistent connection includes inputting contents of at least one field in a first line of a message contained in a packet sent by the follower device over the connection to the initiator device; and
    wherein detecting that communications over the connection are driven by the follower device includes detecting that communications over the connection are driven by the follower device by detecting that the contents of the field in the first line of the message contained in the packet sent by the follower device over the connection to the initiator device indicates that the message is a request message.

6. The method of claim 1, wherein monitoring communications over the persistent connection includes counting a total number of messages sent over the connection from the initiator device to the follower device and counting a total number of messages sent over the connection from the follower device to the initiator device; and
    wherein detecting that communications over the connection are driven by the follower device includes detecting that communications over the connection are driven by the follower device by detecting that the total number of messages sent from the follower device to the initiator device exceeds the total number of messages sent from the initiator device to the follower device.

7. The method of claim 1, wherein monitoring communications over the persistent connection includes checking messages sent over the connection for at least one header field that is required to be included in request messages; and wherein detecting that communications over the connection are driven by the follower device includes detecting that communications over the connection are driven by the follower device by detecting the header field that is required to be included in request messages in a message sent over the connection from the follower device to the initiator device.

8. The method of claim 1, wherein monitoring communications over the persistent connection includes checking messages sent over the connection for at least one header field that is required to be included in request messages; and wherein detecting that communications over the connection are driven by the follower device includes detecting that communications over the connection are driven by the follower device by detecting a message sent over the connection from the initiator device to the follower device that does not include the header field that is required to be included in request messages.

9. The method of claim 1, wherein monitoring communications over the persistent connection includes checking messages sent over the connection for at least one header field that is required to be included in response messages; and wherein detecting that communications over the connection are driven by the follower device includes detecting that communications over the connection are driven by the follower device by detecting the header field that is required to be included in response messages in a message sent over the connection from the initiator device to the follower device.

10. The method of claim 1, wherein monitoring communications over the persistent connection includes checking messages sent over the connection for at least one header field that is required to be included in response messages; and wherein detecting that communications over the connection are driven by the follower device includes detecting that communications over the connection are driven by the follower device by detecting a message sent over the connection from the follower device to the initiator device that does not include the header field that is required to be included in a response messages.

11. The method of claim 1, wherein monitoring communications over the persistent connection includes measuring a total volume of data sent over the connection from the initiator device to the follower device and measuring a total volume of data sent over the connection from the follower device to the initiator device; and wherein detecting that communications over the connection are driven by the follower device includes detecting that communications over the connection are driven by the follower device by detecting that the total volume of data sent over the connection from the initiator device to the follower device exceeds the total volume of data sent over the connection from the follower device to the initiator device.

12. The method of claim 1, wherein monitoring communications over the persistent connection includes calculating an average message size for messages sent over the connection from the initiator device to the follower device and calculating an average message size for messages sent over the connection from the follower device to the initiator device; and wherein detecting that communications over the connection are driven by the follower device includes detecting that communications over the connection are driven by the follower device by detecting that the average message size for messages sent over the connection from the initiator device to the follower device exceeds the average messages size for messages sent over the connection from the follower device to the initiator device.

13. The method of claim 1, wherein monitoring communications over the persistent connection includes calculating an average time delay between message receipt and subsequent message transmission at the initiator device, and calculating an average time delay between message receipt and subsequent message transmission at the follower device; and wherein detecting that communications over the connection are driven by the follower device includes detecting that communications over the connection are driven by the follower device by detecting that the average time delay between message receipt and subsequent message transmission at the follower device exceeds the average time delay between message receipt and subsequent message transmission at the initiator device.

14. The method of claim 1, wherein monitoring communications over the persistent connection includes checking messages sent over the connection for at least one header field that is defined to be valid only in request messages; and wherein detecting that communications over the connection are driven by the follower device includes detecting that communications over the connection are driven by the follower device by detecting the header field that is defined to be valid only in request messages in a message sent over the connection from the follower device to the initiator device.

15. The method of claim 1, wherein monitoring communications over the persistent connection includes checking messages sent over the connection for at least one header field that is defined to be valid only in response messages; and wherein detecting that communications over the connection are driven by the follower device includes detecting that communications over the connection are driven by the follower device by detecting the header field that is defined to be valid only in response messages in a message sent over the connection from the initiator device to the follower device.

16. The method of claim 1, further comprising:

for each header field detected in at least one message sent over a plurality of monitored connections, i) counting a total number of messages in which the header field is detected that are likely request messages, and ii) counting a total number of messages in which the header field is detected that are likely response messages;

wherein monitoring communications over the persistent connection includes checking whether each header field contained in each message sent over the connection from the follower device to the initiator device has previously only been detected in one or more messages that are likely request messages; and wherein detecting that communications over the connection are driven by the follower device includes detecting that communications over the connection are driven by the follower device by detecting a header field that has previously only been detected in one or more messages that are likely request messages in a message sent over the connection from the follower device to the initiator device.

17. The method of claim 16, further comprising:
wherein monitoring communications over the persistent connection includes checking whether each header field contained in each message sent over the connection from the initiator device to the follower device has previously only been detected in one or more messages that are likely request messages; and
wherein detecting that communications over the connection are driven by the follower device includes detecting that communications over the connection are driven by the follower device by detecting a header field that has previously only been detected in one or more messages that are likely request messages in a message sent over the connection from the initiator device to the follower device.

18. The method of claim 16, wherein messages that are likely request messages comprise i) messages sent from an initiator device to a follower device on those of the plurality of monitored connections for which no indication has been generated that the follower device is driving communications on the connection, and ii) messages sent from a follower device to an initiator device on those of the monitored connections for which at least one indication has been generated that the follower device is driving communications on the connection; and
wherein messages that are likely response messages comprise i) messages sent from a follower device to an initiator device on those of the plurality of monitored connections for which no indication has been generated that the follower device is driving communications on the connection, and ii) messages sent from an initiator device to a follower device on those of the monitored connections for which at least one indication has been generated that the follower device is driving communications on the connection.

19. The method of claim 1, wherein monitoring communications over the persistent connection includes inputting a SYN flag contained in a header of the first packet sent from the initiator device to the follower device to open the connection; and
wherein detecting that communications over the connection are driven by the follower device includes detecting an attempted connection reversal during establishment of the connection by detecting that the SYN flag contained in the header of the first packet sent from the initiator device to the follower device to open the connection is not set.

20. The method of claim 1, wherein monitoring communications over the persistent connection includes i) inputting a SYN flag and an ACK flag contained in a header of each packet sent from the initiator device to the follower device, and ii) detecting that the first packet sent from the initiator device to the follower device to open the connection has the SYN flag set but not the ACK flag set; and
wherein detecting that communications over the connection are driven by the follower device includes detecting an attempted connection reversal by detecting that both the SYN flag and the ACK flag are set in at least one subsequent packet sent from the initiator device to the follower device.

21. A network monitor device for protecting a network from advanced persistent threats by detecting malicious remote-administration-tools, comprising:

memory; and
processing circuitry coupled to the memory, the memory storing program code which, when executed by the processing circuitry, causes the processing circuitry to:
monitor communications over a persistent connection traversing at least a portion of the network, the connection operable to carry packets between an initiator device and a follower device, the initiator device having sent a first packet to the follower device to open the connection, wherein the network monitor monitors the communications over the connection at least in part by capturing each packet communicated between the initiator device and the follower device subsequent to the connection being opened;
detect reverse-connection activity on the connection in response to the monitored communications over the connection by, at least in part, detecting, responsive to packet data contained in each packet communicated between the initiator device and the follower device subsequent to the connection being opened, that the communications over the connection are driven by the follower device, wherein detecting reverse-connection activity on the connection indicates that the follower device is a client component of a malicious remote-administration-tool and that the initiator device is a server component of the malicious remote-administration-tool; and
generate, in response to detecting the reverse-connection activity on the connection, an output indicating that the malicious remote-administration-tool is using the connection.

22. A computer program product having a non-transitory computer readable medium which stores a set of instructions operable to protect a network from advanced persistent threats by detecting malicious remote-administration-tools, the set of instructions, when carried out by processing circuitry of a network monitor device located within the network, causing the processing circuitry to:
monitor communications over a persistent connection traversing at least a portion of the network, the connection operable to carry packets between an initiator device and a follower device, the initiator device having sent a first packet to the follower device to open the connection, wherein the communications over the connection are monitored at least in part by capturing each packet communicated between the initiator device and the follower device subsequent to the connection being opened;
detect reverse-connection activity on the connection in response to the monitored communications over the connection by, at least in part, detecting, responsive to packet data contained in each packet communicated between the initiator device and the follower device subsequent to the connection being opened, that the communications over the connection are driven by the follower device, wherein detecting reverse-connection activity on the connection indicates that the follower device is a client component of a malicious remote-administration-tool and that the initiator device is a server component of the malicious remote-administration-tool; and
generate, in response to detecting the reverse-connection activity on the connection, an output indicating that the malicious remote-administration-tool is using the connection.

* * * * *